(12) United States Patent
Wu et al.

(10) Patent No.: US 12,285,921 B1
(45) Date of Patent: Apr. 29, 2025

(54) SKIN MANUFACTURING POST-TREATMENT METHOD FOR AUTOMOBILE COLLISION DUMMY

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Yongqiang Wu, Tianjin (CN); Zhixin Liu, Tianjin (CN); Weidong Liu, Tianjin (CN); Tianyi Hao, Tianjin (CN); Kai Wang, Tianjin (CN); Hanxiao Zhang, Tianjin (CN); Hongyang Qi, Tianjin (CN); Peng Liu, Tianjin (CN); Nan Zhang, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/812,583
(22) Filed: Aug. 22, 2024
(30) Foreign Application Priority Data

Feb. 8, 2024 (CN) .......................... 202410176890.5

(51) Int. Cl.
  *B29C 73/02* (2006.01)
  *B29C 73/26* (2006.01)
  (Continued)

(52) U.S. Cl.
  CPC .............. *B29C 73/02* (2013.01); *B29C 73/26* (2013.01); *B29C 73/34* (2013.01); *B29C 2073/264* (2013.01); *B29L 2031/702* (2013.01)

(58) Field of Classification Search
  CPC ... B29C 73/26; B29C 73/34; B29C 2073/264; B29C 44/18; B29C 44/334; B29C 44/0415; B23P 6/002
  See application file for complete search history.

(56) References Cited

U.S. PATENT DOCUMENTS

| 4,196,880 A | * | 4/1980 | Hynes | ..................... B65B 67/12 312/4 |
| 4,842,663 A | * | 6/1989 | Kramer | ................... B29C 73/04 428/192 |

(Continued)

FOREIGN PATENT DOCUMENTS

| CN | 101372153 A | 2/2009 |
| CN | 114193696 A | 3/2022 |

(Continued)

OTHER PUBLICATIONS https://www.humaneticsgroup.com/ (Year: 2015).*

(Continued)

*Primary Examiner* — James M Mellott
*Assistant Examiner* — Debjani Roy
(74) *Attorney, Agent, or Firm* — Westbridge IP LLC

(57) ABSTRACT

A skin manufacturing post-treatment method for an automobile collision dummy includes: forming a first pouring portion on a skin layer to be treated, and forming a patching recess by grinding the first pouring portion; obtaining an epidermis layer to be treated, and arranging a heating assembly above the patching recess, where the heating assembly is attached to an interior of the patching recess, and the epidermis layer; and simultaneously heating, by the heating assembly, the patching recess and the epidermis layer to be treated. In this way, the epidermis layer to be treated and an inner wall of the patching recess can be simultaneously heated at the first preset temperature, the epidermis layer to be treated and the inner wall of the patching recess are consistent in temperature, and a connection strength between the epidermis layer to be treated and the inner wall of the patching recess is enhanced.

9 Claims, 13 Drawing Sheets

(51) Int. Cl.
*B29C 73/34* (2006.01)
*B29L 31/00* (2006.01)

(56) References Cited

U.S. PATENT DOCUMENTS

| | | | | |
|---|---|---|---|---|
| 4,978,704 A | * | 12/1990 | Perrin | C08L 83/04 |
| | | | | 524/789 |
| 5,207,541 A | * | 5/1993 | Westerman | B24B 23/08 |
| | | | | 409/179 |
| 6,270,603 B1 | | 8/2001 | Westerman et al. | |
| 2023/0166432 A1 | * | 6/2023 | Liu | B29C 44/06 |
| | | | | 264/45.1 |

FOREIGN PATENT DOCUMENTS

| | | |
|---|---|---|
| CN | 114211785 A | 3/2022 |
| CN | 114889173 A | 8/2022 |
| CN | 117162549 A | 12/2023 |

OTHER PUBLICATIONS

Notification to Grant Patent Right for Invention issued in counterpart Chinese Patent Application No. 202410176890.5, dated Mar. 26, 2024.

* cited by examiner

SKIN MANUFACTURING POST-TREATMENT METHOD FOR AUTOMOBILE COLLISION DUMMY

CROSS-REFERENCE TO RELATED APPLICATIONS

This application claims priority to Chinese Patent Application No. 202410176890.5, filed on Feb. 8, 2024, the content of which is incorporated herein by reference in its entirety.

TECHNICAL FIELD

The disclosure relates to the technical field of dummy skins, in particular to a skin manufacturing post-treatment method for an automobile collision dummy.

BACKGROUND

A dummy is indispensable for testing safety performance of an automobile based on its damage data collected in a collision test.

A dummy skin is injection-molded by injecting its materials into a mold, but its finished product is likely to have protrusions requiring to be cut or ground before use. However, in the prior art, the injection-molded dummy skin is likely to suffer from deterioration of performances including but not limited to durability, compression resistance and tension capacity when post-treated since its gate cut cannot be guaranteed integral. Further, the subsequent processes become difficult to implement and the aesthetics of the manufactured dummy skin is spoiled by the inconsistency between a patched gate and the remaining portions.

SUMMARY

An objective of the disclosure is to provide a skin manufacturing post-treatment method for an automobile collision dummy for solving the problems above. The method includes:

obtaining a skin layer to be treated, where the skin layer to be treated at least includes: an epidermis layer and a muscle layer that is formed at a side of the epidermis layer; selecting a first machining area on the skin layer to be treated, and forming a first pouring portion on the first machining area; and grinding the first pouring portion, and causing a side, far away from the epidermis layer, of the first pouring portion to dip, and form a patching recess;

obtaining an epidermis layer to be treated, and causing the epidermis layer to be treated to be above the first machining area, and a center of the epidermis layer to be treated to be on a central axis of the patching recess, where a heating assembly is arranged above the patching recess, the heating assembly has a heating space, and the epidermis layer to be treated is located in the heating space;

applying a first pressure to the epidermis layer to be treated along the central axis of the patching recess, and driving the patching recess to move in a direction close to the heating assembly until the heating assembly is attached to an interior of the patching recess, and the epidermis layer to be treated; and turning on the heating assembly, simultaneously heating the epidermis layer to be treated and the patching recess at a first preset temperature until accumulated heating time reaches first preset duration, and applying a second pressure to the epidermis layer to be treated along the central axis of the patching recess, where the second pressure enables the epidermis layer to be treated to be placed in the patching recess; and maintaining the second pressure for second preset duration until an outer wall of the epidermis layer to be treated is attached to an inner wall of the patching recess in a circumferential direction of the inner wall of the patching recess.

Compared with the prior art, the disclosure has the following beneficial effects: at first in the disclosure, the skin layer to be treated is obtained, then the first machining area is selected on the skin layer to be treated, the first pouring portion is formed on the first machining area, and then the patching recess is formed by grinding the first pouring portion. Then the epidermis layer to be treated is obtained, the epidermis layer to be treated is caused to be above the first machining area, and the heating assembly is arranged above the patching recess. Then the first pressure is applied to the epidermis layer to be treated along the central axis of the patching recess, and the patching recess is driven to move in the direction close to the heating assembly until the heating assembly is attached to the interior of the patching recess, and the epidermis layer to be treated. The heating assembly is turned on to simultaneously heat the patching recess and the epidermis layer to be treated at the first preset temperature, and the epidermis layer to be treated is caused to be attached to the inner wall of the patching recess.

In a use process, at first, the skin layer to be treated is obtained, the first machining area is selected, the first pouring portion is formed, and the patching recess is formed by grinding the first pouring portion. Then the epidermis layer to be treated is obtained, and caused to be above the first machining area, the heating assembly is controlled to be simultaneously attached to the inner wall of the patching recess, and the epidermis layer to be treated, and the heating assembly is turned on to simultaneously heat the patching recess and the epidermis layer to be treated. Then the epidermis layer to be treated is placed in the patching recess to be attached to the inner wall of the patching recess.

According to the method of the disclosure, the epidermis layer to be treated can be located inside the heating space, and the epidermis layer to be treated that is located inside the heating space also moves in the same direction when the heating assembly moves in the direction close to the patching recess, such that the heating assembly is simultaneously attached to the epidermis layer to be treated and the inner wall of the patching recess. The epidermis layer to be treated and the inner wall of the patching recess can be simultaneously heated during heating, the epidermis layer to be treated and the inner wall of the patching recess are consistent in temperature, and a connection strength between the epidermis layer to be treated and the inner wall of the patching recess is enhanced. Thus, the performance of a dummy skin manufactured is enhanced, especially durability, compression resistance and tension capacity of the dummy skin compared with the prior art, and efficiency of a subsequent treatment process is also improved. By the method of the disclosure, the durability, the compression resistance and the tension capacity of the dummy skin patched are enhanced, and aesthetics of a joint are also enhanced.

DETAILED DESCRIPTION OF THE EMBODIMENTS

As shown in FIGS. 1a, 1b, 1c and 1d, a skin manufacturing post-treatment method for an automobile collision dummy in some examples includes the following steps.

S1. A skin layer 01 to be treated is obtained, where the skin layer 01 to be treated at least includes: an epidermis layer 01-1 and a muscle layer 01-2 that is formed at a side of the epidermis layer 01-1. A first machining area 01-3 is selected on the skin layer 01 to be treated, and a first pouring portion 01-5 is formed on the first machining area 01-3. The first pouring portion 01-5 is ground, and a side, far away from the epidermis layer 01-1, of the first pouring portion 01-5 is caused to dip, to form a patching recess 01-6.

The patching recess 01-6 is frustum-shaped, and an opening end of the patching recess 01-6 is a large-diameter end.

Specifically, in this example, the skin layer 01 to be treated is obtained at first, and the skin layer 01 to be treated includes the epidermis layer 01-1 and the muscle layer 01-2 that is formed at a side of the epidermis layer 01-1. After the skin layer 01 to be treated is obtained, it is necessary to select the first machining area 01-3 on the skin layer 01 to be treated. The skin layer 01 to be treated is injection-molded, and an injection molding residual material may be left on the skin layer 01 to be treated accordingly. An area where the injection molding residual material comes into contact with the epidermis layer 01-1 is the first machining area 01-3. After the first machining area 01-3 is selected, the first pouring portion 01-5 is formed, a grinding station 7 is further arranged above the first machining area 01-3, the grinding station 7 has a grinding tool, and a blade of the grinding tool forms an included angle of 45 degrees with the horizontal plane. The grinding tool is configured to grind the first pouring portion 01-5, and a side, far away from the epidermis layer 01-1, of the first pouring portion 01-5 is caused to dip, to form the patching recess 01-6. The patching recess 01-6 is frustum-shaped, and the opening end of the patching recess 01-6 is the large-diameter end.

The step that a first pouring portion 01-5 is formed on the first machining area 01-3 includes:

a first treatment portion 01-4 is formed on an epidermis layer 01-1 of the first machining area 01-3 by using a first cutting portion 4-17, where the first cutting portion 4-17 has a second preset temperature; and the first treatment portion 01-4 is formed by using the first cutting portion 4-17, and the first pouring portion 01-5 is formed; where the first cutting portion 4-17 has a third preset temperature.

The second preset temperature is higher than the third preset temperature.

Figure 3:
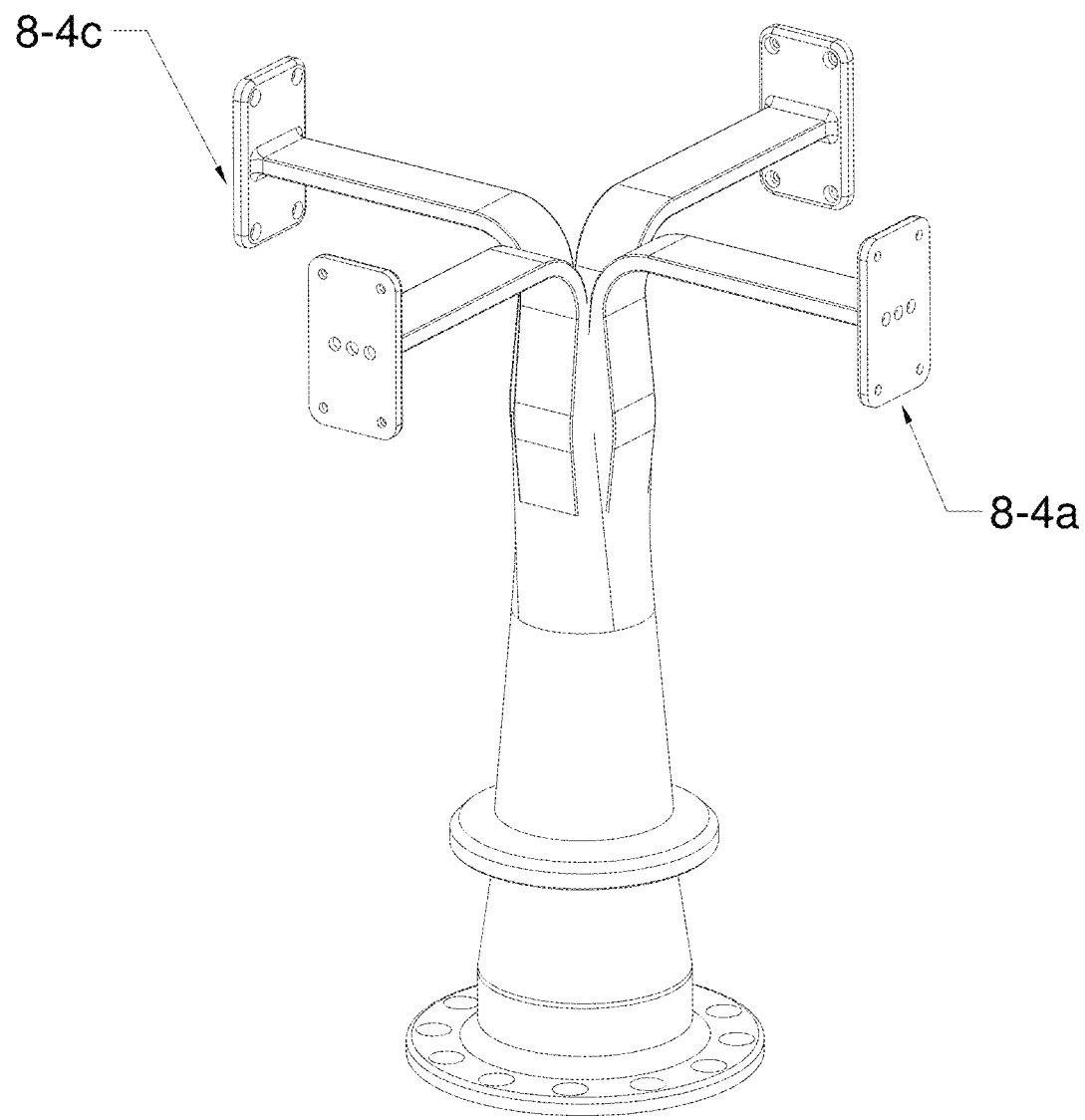
FIG. 3 shows a schematic diagram of a rotary operation table according to an example of the disclosure.
Figure 4A:
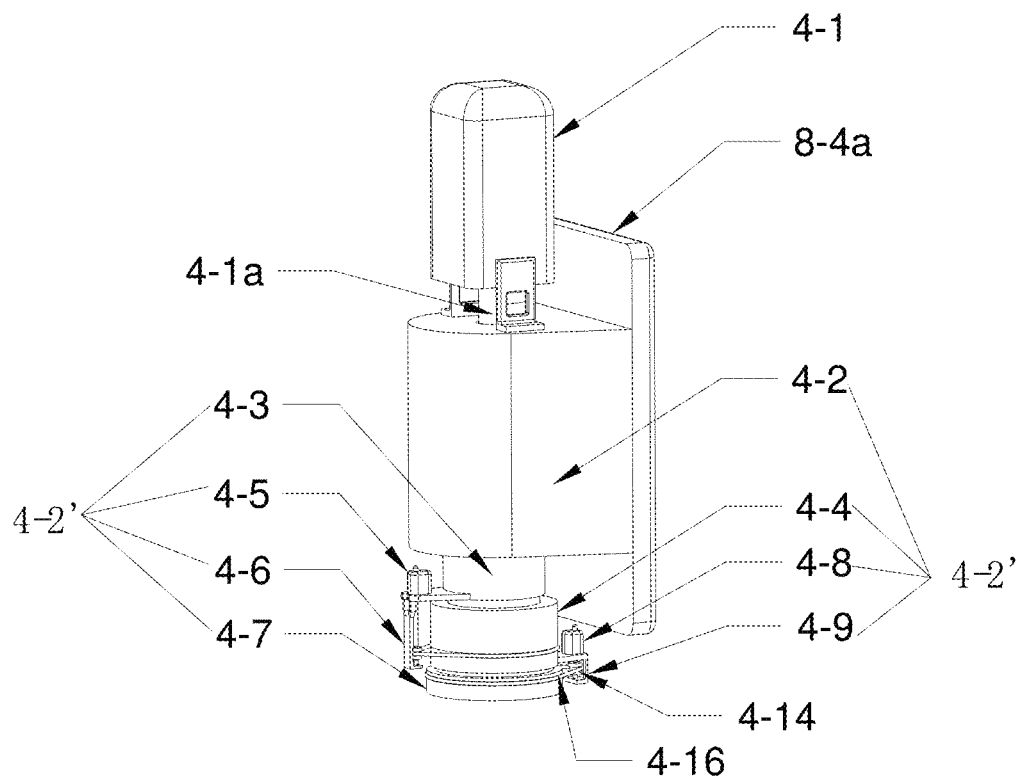
FIG. 4 shows a schematic diagram of a cutting station according to an example of the disclosure.
Figure 4B:
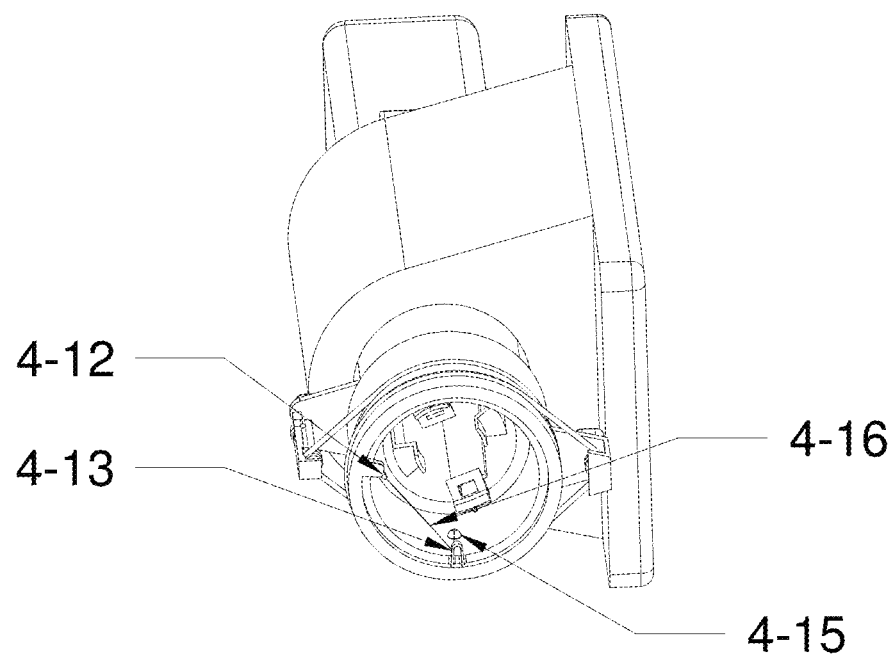
Figure 4C:
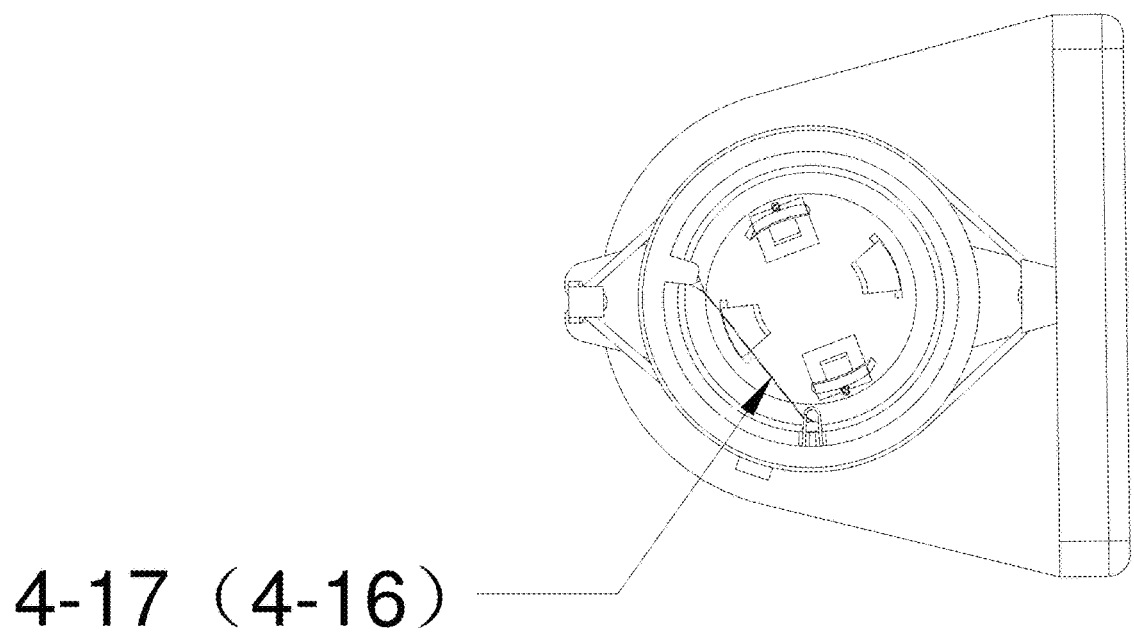
Figure 5:
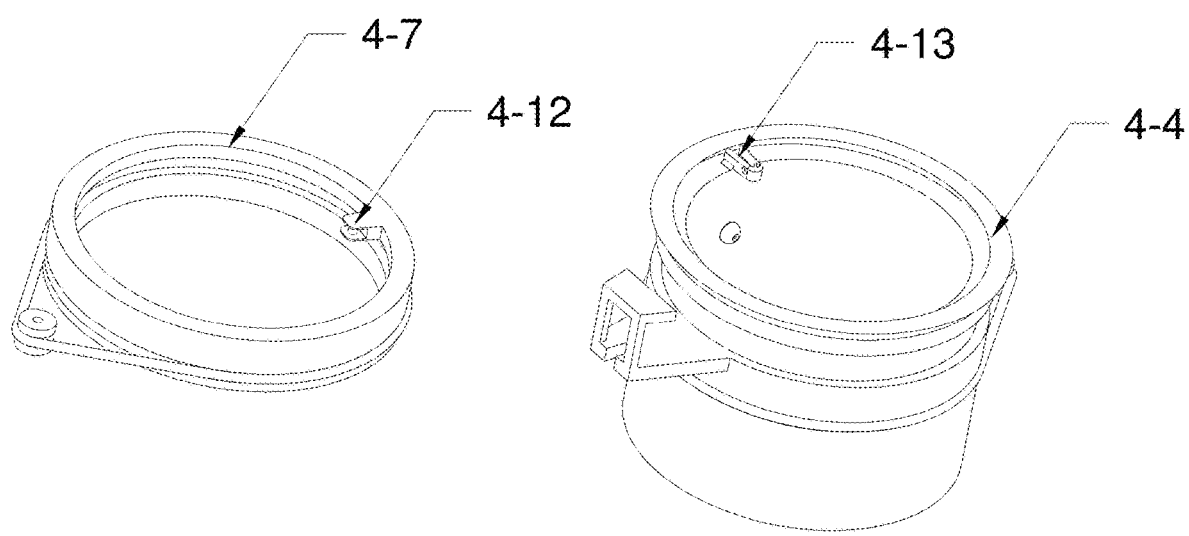
FIG. 5 shows a schematic diagram of an upper rotary ring and a lower rotary ring according to an example of the disclosure.

Specifically, in this example, as shown in FIGS. 2, 3, 4a, 4b, 4c and 5, a cutting station 4 is further arranged above the first machining area 01-3, and the first machining area 01-3 is cut by the cutting station 4. The cutting station 4 includes a second support plate 8-4a, and a second lifting driving assembly 4-1 is mounted on the second support plate 8-4a. A cutting assembly 4-2' is mounted at a drive end of the second lifting driving assembly 4-1, the cutting assembly 4-2' includes a direct-acting sleeve 4-3, and an upper rotary ring 4-4 is rotatably connected at the other end of the direct-acting sleeve 4-3. An upper rotary ring servo motor 4-5 is arranged on an outer side wall of the direct-acting sleeve 4-3, an upper rotary ring servo motor speed reducer 4-6 is mounted at a drive end of the upper rotary ring servo motor 4-5, and a drive end of the upper rotary ring servo motor speed reducer 4-6 is connected to the upper rotary ring 4-4 through belt transmission. When the upper rotary ring servo motor 4-5 rotates, the upper rotary ring 4-4 also rotates under the action of belt transmission. The outer wall of the upper rotary ring 4-4 is provided with a lower rotary ring servo motor 4-8, a drive end of the lower rotary ring servo motor 4-8 is connected to a lower rotary ring servo motor speed reducer 4-9, the lower rotary ring servo motor speed reducer 4-9 is connected to the lower rotary ring 4-7 through belt transmission, and a belt sleeves a belt pulley. The lower rotary ring 4-7 is rotatably connected below the upper rotary ring 4-4. A part of the lower rotary ring 4-7 sleeves an exterior of the upper rotary ring 4-4. When the drive end of the lower rotary ring servo motor 4-8 rotates, the lower rotary ring 4-7 also rotates under the action of belt transmission since the belt sleeves a belt pulley. Since the lower rotary ring servo motor 4-8 is fixed to the upper rotary ring 4-4, when the upper rotary ring 4-4 rotates, the lower rotary ring 4-7 also rotates synchronously even if the lower rotary ring servo motor 4-8 is not turned on. A copper wire tensioning wheel 4-14 that is configured to wind a copper wire 4-16 is arranged at the outer wall of the upper rotary ring 4-4. The copper wire tensioning wheel 4-14 may rotate around its own central axis, and an extension direction of the central axis is a vertical direction. A copper wire inlet hole 4-15 is provided in the side wall of the upper rotary ring 4-4, and a bottom of the upper rotary ring 4-4 is provided with a copper wire tractor 4-13, as shown in FIG. 5. The copper wire tractor 4-13 includes a first traction portion and a second traction portion, the first traction portion and the second traction portion extend in a direction far away from the inner wall of the upper rotary ring 4-4, and the other ends of the first traction portion and the second traction portion are provided with copper wire passing holes respectively. The two copper wire passing holes form a guide channel for the copper wires 4-16 to pass therethrough, so as to prevent the copper wire 4-16 from being broken when extended or shortened. A copper wire heating body 4-12 is arranged on a bottom of an inner wall of the lower rotary ring 4-7, as shown in FIG. 5, the copper wire heating body 4-12 and the copper wire tractor 4-13 are on the same horizontal plane, a free end of the copper wire 4-16 is connected to the copper wire heating body 4-12, and the copper wire heating body 4-12 is configured to heat the copper wire 4-16. When the lower rotary ring 4-7 rotates, the copper wire heating body 4-12 pulls the copper wire 4-16 to correspondingly extend or shorten the copper wire 4-16 in a cavity of the lower rotary ring 4-7, thus forming first cutting portions 4-17 that have different diameters and further forming envelope circles that have different diameters for cutting the first machining area 01-3.

During use, the lower rotary ring servo motor 4-8 is controlled to operate for first duration at first. When accumulated time reaches the first duration, the lower rotary ring 4-7 rotates by a first preset angle, the copper wire 4-16 forms the first cutting portion 4-17 that has a first preset length in the inner cavity of the lower rotary ring 4-7, and the first cutting portion 4-17 that has the first preset length is in abutted connection to an outer surface of the epidermis layer 01-1.

The lower rotary ring servo motor 4-8 is controlled to operate for second duration. When accumulated time reaches the second duration, the lower rotary ring 4-7 further rotates by a second preset angle on the basis of the first preset angle, the copper wire 4-16 forms the first cutting portion 4-17 that has a second preset length in the inner cavity of the lower rotary ring 4-7, and the first cutting portion 4-17 that has the second preset length is in abutted connection to an inner surface of the epidermis layer 01-1. Then the direct-acting sleeve 4-3 is controlled to rotate through a circle, the first cutting portion 4-17 that has the second preset length forms a first envelope circle, and a diameter of the first envelope circle is a diameter of an end, close to the injection molding residual material in the first machining area 01-3, of the epidermis layer 01-1. When the lower rotating ring 4-7 rotates from the first preset angle to the second preset angle, the first cutting portion 4-17 has the second preset temperature, and the copper wire 4-16 is heated to the second preset temperature by using the copper wire heating body 4-12. After the first cutting portion 4-17 rotates through one circle, the first treatment portion 01-4 is formed on an epidermis of the first machining area 01-3. The first treatment portion 01-4 includes a portion, exposed to air, of the muscle layer 01-2 inside the epidermis layer 01-1, and a computation method of the first preset angle and the first duration is as follows:

let the first preset angle be $\gamma_1$, then $$\cos\gamma_1 = \frac{4r_{s1}^2 - 2r_{t1}^2}{2r_{t1}^2}.$$

In the equation: $r_{s1}$ denotes half the diameter of an epidermis layer outer surface of an end, close to the injection molding residual material in the first machining area, of the epidermis layer;

$r_{t1}$ denotes a circumferential radius where a traction end of the copper wire heating body is located.

Then $$\gamma_1 = \frac{\pi\omega_1}{30} \cdot \frac{r_{d2}}{r_{h2}} \cdot t_{d1}.$$

In the equation: $\omega_1$ denotes a rotational speed of the lower rotary ring servo motor 4-8;

$r_{d2}$ denotes a radius of the pulley connected to an output end of the lower rotary ring servo motor 4-8;

$r_{h2}$ denotes an effective radius formed by the lower rotary ring 4-7 and the belt, where an annular recess is provided in an outer wall of the lower rotary ring 4-7, and the effective radius is a radius of the annular recess; and $t_{d1}$ denotes operation duration of the lower rotary ring servo motor 4-8, that is, the first duration.

Then the first duration can be computed through the simultaneous equation, that is, time when the first cutting portion that has the first preset length abuts against the outer surface of the epidermis layer. The first preset angle can be indirectly controlled by controlling the operation duration of the lower rotary ring servo motor 4-8.

A computation method of the second preset angle and the second duration is as follows:

let the second preset angle be $\gamma_2$, then $$\cos\gamma_2 = \frac{4r_{s2}^2 - 2r_{t1}^2}{2r_{t1}^2}.$$

In the equation: $r_{s2}$ denotes half the diameter of an epidermis layer inner surface of an end, close to the injection molding residual material in the first machining area, of the epidermis layer.

Then $$\gamma_2 = \frac{\pi\omega_2}{30} \cdot \frac{r_{d2}}{r_{h2}} \cdot t_{d2} + \gamma_1.$$

In the equation, $\omega_2$ denotes a rotational speed at which the lower rotary ring servo motor 4-8 cuts from the outer surface of the epidermis layer to the inner surface of the epidermis layer, $\omega_2$ is less than $\omega_1$.

The second duration can be computed through the simultaneous equation, that is, time when the first cutting portion 4-17 that has the first preset length becomes the first cutting portion 4-17 that has the second preset length and abuts against the inner surface of the epidermis layer 01-1. The second preset angle can be indirectly controlled by controlling the operation duration of the lower rotary ring servo motor 4-8.

After the first treatment portion 01-4 is formed, heating of the copper wire 4-16 is stopped, the copper wire 4-16 is quickly cooled to a normal temperature, that is, the third preset temperature, and the third preset temperature is lower than the second preset temperature. The epidermis layer 01-1 is cut at the second preset temperature due to small resistance, and the first treatment portion 01-4 is cut at the third preset temperature since the first treatment portion 01-4 is made of muscle that is flexible and elastic deformation of the muscle layer 01-2 has no influence on a subsequent processing.

The lower rotary ring servo motor 4-8 is controlled to drive the lower rotary ring 4-7 to rotate continuously to cause the length of the first cutting portion 4-17 to be equal to a diameter of the lower rotary ring 4-7. Then the upper rotary ring servo motor 4-5 is turned on, such that the upper rotary ring 4-4 drives its lower portion to rotate integrally. A rotation angle of the upper rotary ring servo motor 4-5 is controlled to be=180 degrees, the first treatment portion 01-4 (muscle layer 01-2) can be cut to form the first pouring portion 01-5, that is, the injection molding residual material can be completely cut off from the epidermis layer 01-1, and third duration $t_j$ consumed by the upper rotary ring servo motor 4-5 when rotating by 180 degrees is:

$$\gamma_{13} = \frac{\pi \omega_1}{30} \cdot \frac{r_{d2}}{r_{h2}} \cdot t_j$$

$$t_j = \frac{30}{\omega_1} \cdot \frac{r_{h1}}{r_{d1}}$$

In the equation: $r_{h1}$ denotes an effective radius formed by the upper rotary ring 4-4 and the belt, where an annular recess is provided in an outer wall of the upper rotary ring 4-4, and the effective radius is a radius of the annular recess; and $r_{d1}$ denotes a radius of the pulley connected to an output end of the upper rotary ring servo motor 4-5.

Figure 6:
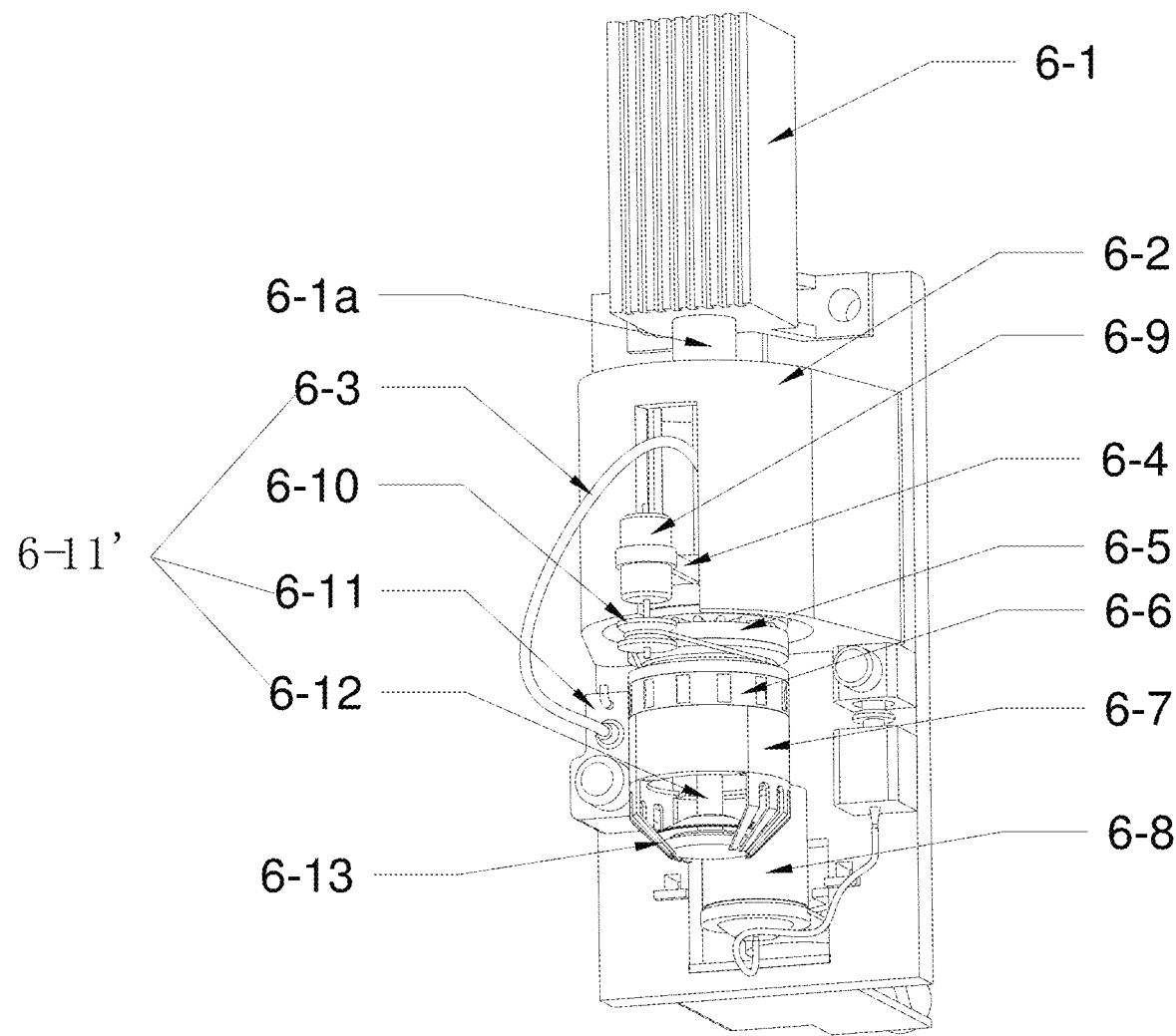
FIG. 6 shows a schematic diagram of a to-be-treated epidermis layer station according to an example of the disclosure.
Figure 10:
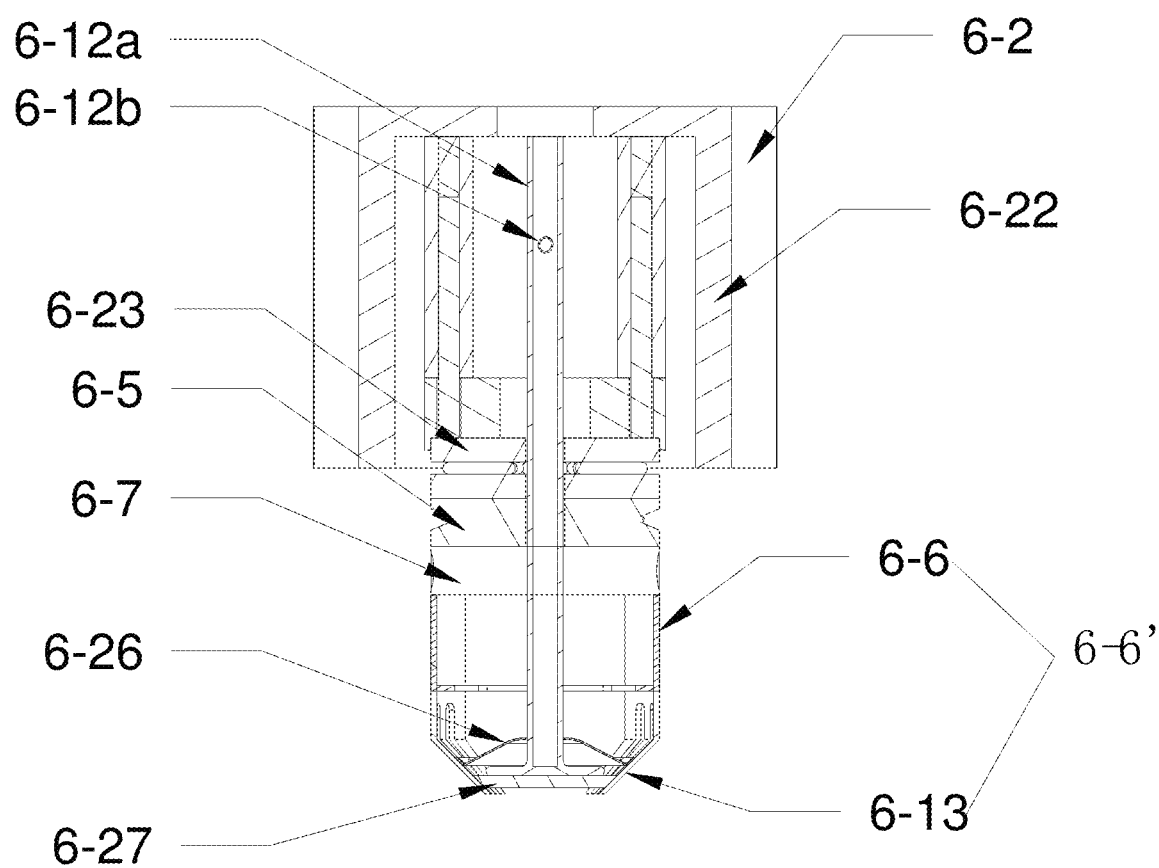
FIG. 10 shows a schematic diagram I of a heating assembly according to an example of the disclosure.
Figure 11:
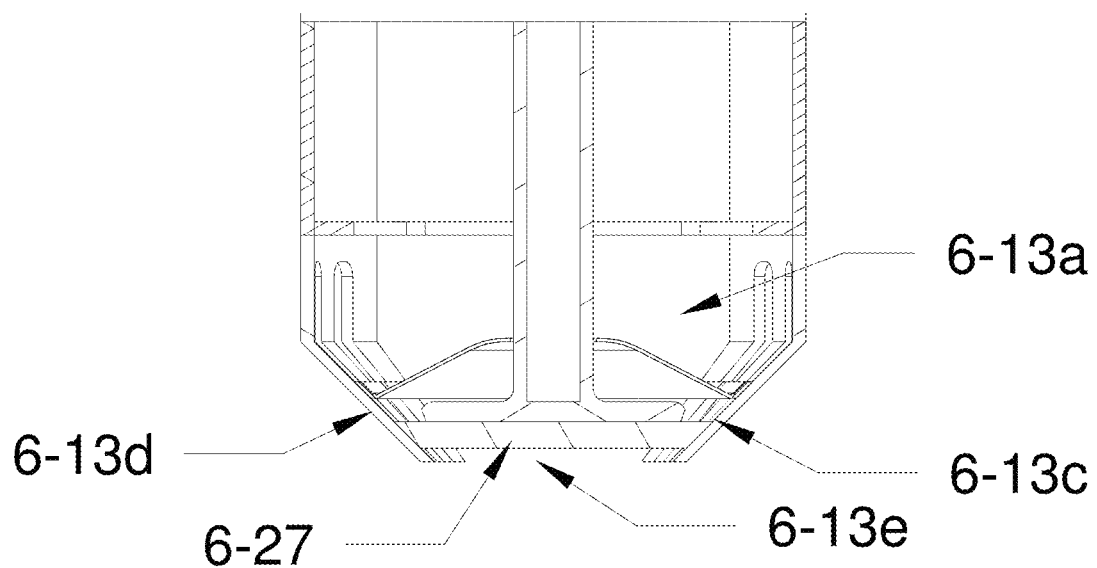
FIG. 11 shows a schematic diagram II of a heating assembly according to an example of the disclosure.

S2. An epidermis layer 6-25 to be treated is obtained, the epidermis layer 6-25 to be treated is caused to be above the first machining area 01-3, a center of the epidermis layer 6-25 to be treated is caused to be on a central axis of the patching recess 01-6, and a heating assembly 6-6' is arranged above the patching recess 01-6, where the heating assembly 6-6' has a heating space 6-13e, and the epidermis layer 6-25 to be treated is in the heating space 6-13e, as shown in FIGS. 6, 10 and 11.

Figure 15:
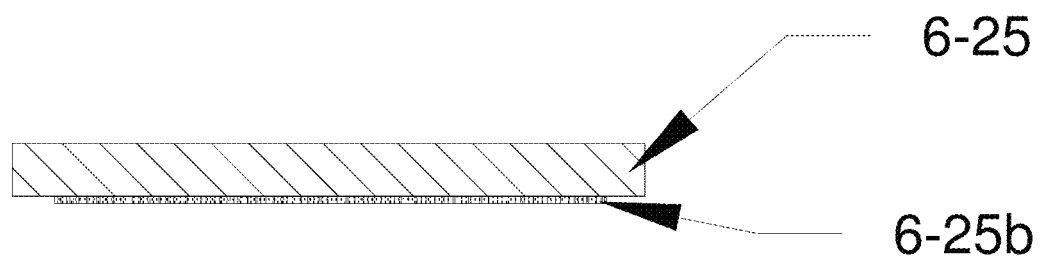
FIG. 15 shows a schematic structural diagram of a epidermis layer to be treated to which adhesive layer is bonded according to an example of the disclosure.

After the step that an epidermis layer 6-25 to be treated is obtained, and before the step that the epidermis layer 6-25 to be treated is caused to be above the first machining area 01-3, the method further includes:

a side, close to the first machining area 01-3, of the epidermis layer 6-25 to be treated is coated with an adhesive layer 6-25b as shown in FIG. 15, where a center of the adhesive layer 6-25b is coaxial with the center of the epidermis layer 6-25 to be treated; and an area ratio of the adhesive layer 6-25b to the epidermis layer 6-25 to be treated is 25:36.

Figure 8:
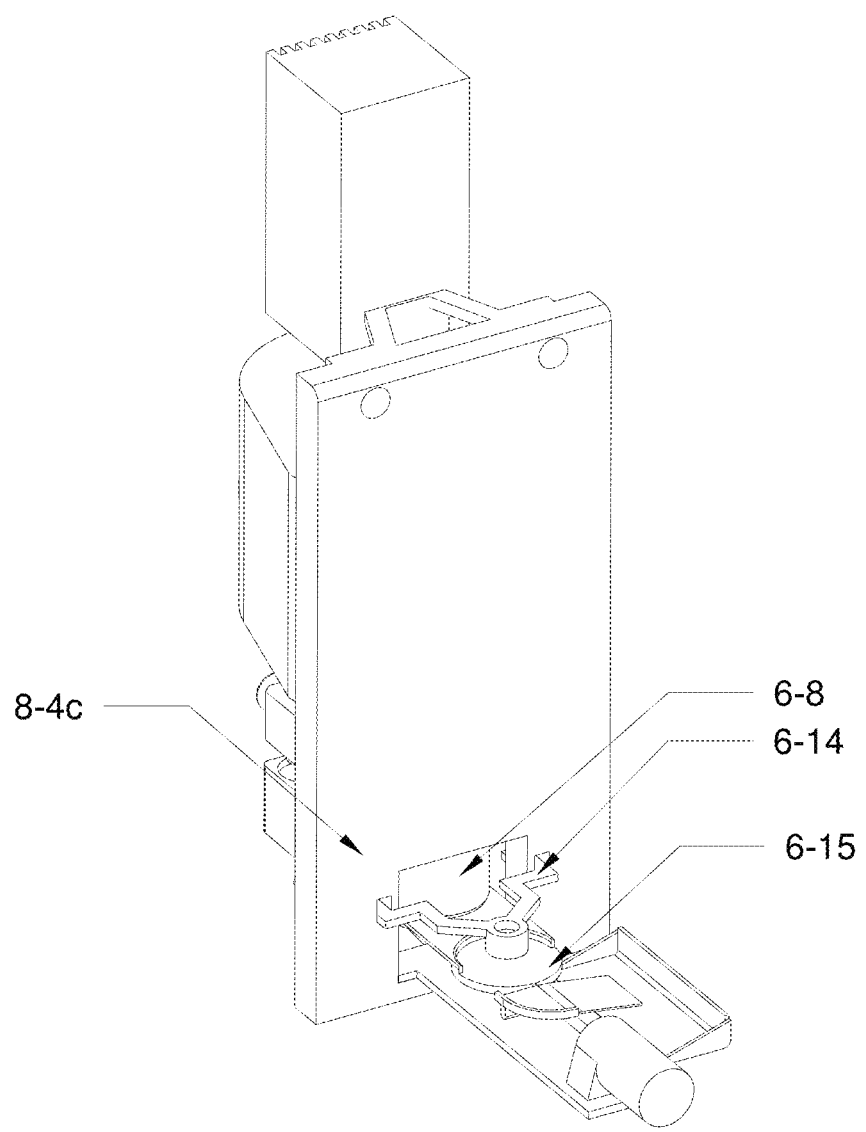
FIG. 8 shows a schematic diagram I of a to-be-treated epidermis layer allocating assembly according to an example of the disclosure.
Figure 9:
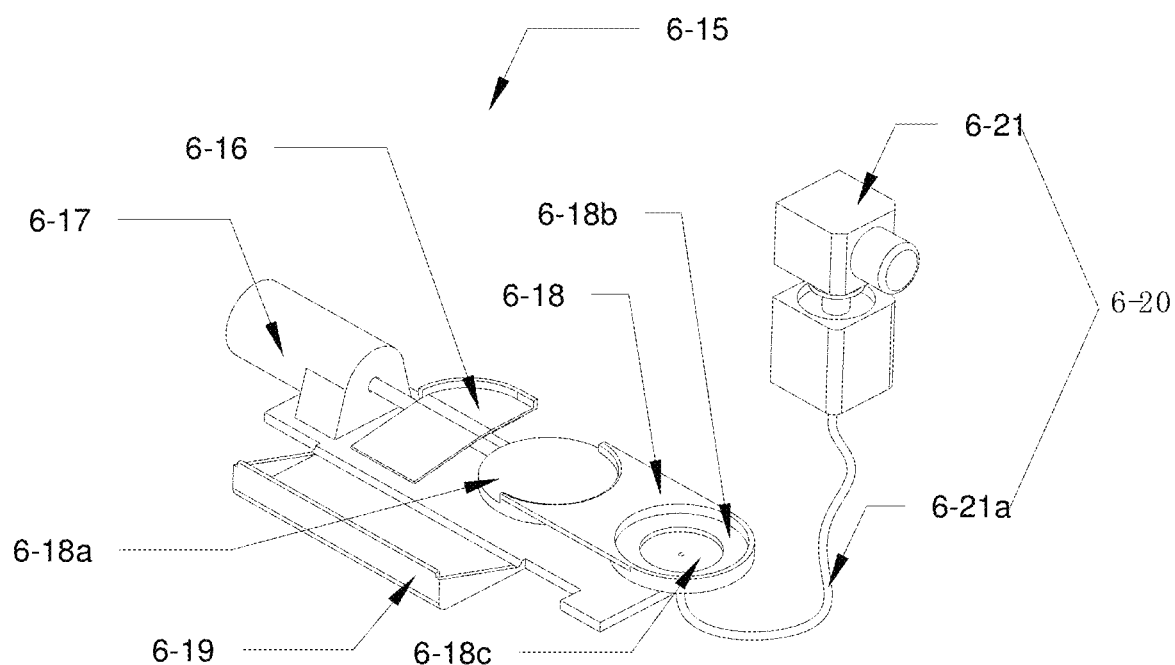
FIG. 9 shows a schematic diagram II of a to-be-treated epidermis layer allocating assembly according to an example of the disclosure.

Specifically, in this example, the epidermis layer 6-25 to be treated is obtained at first, and the epidermis layer 6-25 to be treated is located on the to-be-treated epidermis layer allocating assembly 6-15, as shown in FIGS. 8 and 9. The to-be-treated epidermis layer allocating assembly 6-15 includes a first mounting plate, a movement member 6-18 that is movable in a horizontal direction is slidably arranged on the first mounting plate, and a to-be-treated epidermis layer allocating direct-acting motor 6-17 that drives the movement member 6-18 to move is also arranged on the mounting plate. A to-be-treated epidermis layer containment recess 6-18b is provided in the movement member 6-18, and a bottom of the to-be-treated epidermis layer containment recess 6-18b is provided with a to-be-treated epidermis layer glue containment recess 6-18c. A side, close to the first machining area 01-3, of the epidermis layer 6-25 to be treated is coated with the glue to form the adhesive layer 6-25b, the center of the adhesive layer 6-25b and the center of the epidermis layer 6-25 to be treated are on the same axis, and the adhesive layer 6-25b does not completely cover the lower surface of the epidermis layer 6-25 to be treated, but covers a part of the epidermis layer 6-25 to be treated. In this example, a diameter of the to-be-treated epidermis layer glue containment recess 6-18c is 20 mm, and a diameter of the epidermis layer 6-25 to be treated is 24 mm.

Thus, a computation equation for an area A1 of the adhesive layer is $A1 = \pi r_1^2 = 10^2 \pi$.

In the equation, $r_1$ denotes a radius of an adhesive layer containment recess.

A computation equation for an area A2 of the epidermis layer to be treated is $A2 = \pi r_2^2 = 12^2 \pi$, where $r_2$ denotes a radius of the epidermis layer to be treated.

Then, the ratio $$= \frac{A1}{A2} = \frac{25}{36}$$

of the two areas is computed.

In a process of coating the glue and forming the adhesive layer 6-25b, the glue is contained in the to-be-treated epidermis layer glue containment recess 6-18c, such that the lower surface of the epidermis layer 6-25 to be treated in the to-be-treated epidermis layer containment recess 6-18b is coated with the glue to form the adhesive layer 6-25b. A thickness of the adhesive layer 6-25b is specified, and the glue needs to be injected into the to-be-treated epidermis layer glue containment recess 6-18c by using the glue injection assembly 6-20. A specific structure of the glue injection assembly 6-20 will be introduced in the following examples, and a computation equation for a volume of the glue injected into the to-be-treated epidermis layer glue containment recess 6-18c by the glue injection assembly 6-20 is as follows:

$$V_0 = \frac{\pi D_T^2}{4}(h_j + b_j)$$

In the equation: $D_T$ denotes an area of an adhesive layer containment recess;

$h_j$ denotes a height of the adhesive layer containment recess; and $b_j$ denotes a thickness of an adhesive layer below the epidermis layer to be treated.

Through the above equation, a volume of glue injected into the to-be-treated epidermis layer glue containment recess 6-18c can be computed. Thus, the situation that too many glue is injected and spills can be avoided. Further, the glue can be injected into the to-be-treated epidermis layer glue containment recess 6-18c according to the thickness of the adhesive layer 6-25b and actual needs of the epidermis layer 6-25 to be treated, so as to form the adhesive layer 6-25b that has the specified thickness.

The epidermis layer 6-25 to be treated that has the adhesive layer 6-25b is adsorbed by using the adsorption assembly 6-11'. As shown in FIGS. 6, 10 and 11, the to-be-treated epidermis layer station 6 includes a first lifting driving assembly 6-1 mounted on a first support plate 8-4c, the adsorption assembly 6-11' is mounted on a drive end of the first lifting driving assembly 6-1, the adsorption assembly 6-11' is configured to adsorb and release epidermis layer 6-25 to be treated, and the adsorption assembly 6-11' will be instructed in the following example.

After the epidermis layer 6-25 to be treated to which the adhesive layer 6-25b is bonded is obtained, it is necessary to cause the epidermis layer 6-25 to be treated to be over the first machining area 01-3, and cause the center of the epidermis layer 6-25 to be treated to be on the central axis of the patching recess 01-6. The heating assembly 6-6' and the first lifting driving assembly 6-1 that drives the heating assembly 6-6' to move are further arranged on the first support plate 8-4c. The heating assembly 6-6' includes a heating unit 6-6 and a plurality of elastic reeds 6-13 connected to the heating unit 6-6, the heating unit 6-6 is configured to heat the elastic reeds 6-13, and the plurality of elastic reeds 6-13 are distributed on the same circumference, and jointly define an accommodation space 6-13a. The drive end of the first lifting driving assembly 6-1 is in the accommodation space 6-13a. Free ends of the elastic reeds 6-13 are heating portions 6-13b, the heating portions 6-13b are bent towards an interior of the accommodation space 6-13a to form a frustum-shaped heating space 6-13e, and a taper of the heating space 6-13e is equal to a taper of the patching recess 01-6. The heating portion 6-13b has a first heating surface 6-13c facing the heating space 6-13e and a second heating surface 6-13d facing away from the heating space 6-13e, the first heating surface 6-13c is configured to shape and heat the epidermis layer 6-25 to be treated that is placed in the heating space 6-13e, and the second heating surface 6-13d is configured to heat an inner wall of the patching recess 01-6.

S3. A first pressure is applied to the epidermis layer 6-25 to be treated along the central axis of the patching recess 01-6, and the patching recess 01-6 is driven to move in a direction close to the heating assembly 6-6' until the heating assembly 6-6' is attached to an interior of the patching recess 01-6, and the epidermis layer 6-25 to be treated.

The first lifting driving assembly 6-1 is turned on to drive the adsorption assembly 6-11' to move in a direction close to the to-be-treated epidermis layer containment recess 6-18b, that is, the first pressure is applied to the epidermis layer 6-25 to be treated along the central axis of the patching recess 01-6 until the first heating surface 6-13c is attached to the epidermis layer 6-25 to be treated, such that the epidermis layer 6-25 to be treated can be shaped. At the same time, the patching recess 01-6 also moves in the direction close to the epidermis layer 6-25 to be treated until the second heating surface 6-13d is attached to the inner wall of the patching recess 01-6.

S4. The heating assembly 6-6' is turned on, the epidermis layer 6-25 to be treated and the patching recess 01-6 are simultaneously heated at a first preset temperature until accumulated heating time reaches first preset duration, and a second pressure is applied to the epidermis layer 6-25 to be treated along the central axis of the patching recess 01-6, where the second pressure enables the epidermis layer 6-25 to be treated to be placed in the patching recess 01-6. The second pressure for second preset duration is maintained until an outer wall of the epidermis layer 6-25 to be treated is attached to an inner wall of the patching recess 01-6 in a circumferential direction of the inner wall of the patching recess 01-6.

Specifically, in this example, the heating unit 6-6 is turned on to simultaneously heat the epidermis layer 6-25 to be treated and the patching recess 01-6 at the first preset temperature, and the first preset temperature is 220 degrees Celsius in this example. When cumulative heating duration reaches the first preset duration (the first preset duration is 10 S in this example), the epidermis layer 6-25 to be treated presents a cone frustum shape with a large-diameter end facing upwards and a small-diameter end facing downwards. The patching recess 01-6 moves in a direction far away from the heating assembly 6-6' until the inner wall of the patching recess 01-6 is separated from the second heating surface 6-13d. In addition, the skin layer 6-25 to be heated that is heated and shaped also enters into the patching recess 01-6 under the action of push of the first lifting driving assembly 6-1, that is, the second pressure is applied to the epidermis layer 6-25 to be treated, the epidermis layer 6-25 to be heated that is molten and the patching recess 01-6 that is molten are fully bonded to each other and cooled for the second preset duration, and the second preset duration is 20 S in this example. Then the first lifting driving assembly 6-1 drives a shaping sheet 6-27 to be separated from the epidermis 6-25 to be heated, and the outer wall of the epidermis 6-25 to be treated is completely attached to the inner wall of the patching recess 01-6 accordingly.

Figure 16:
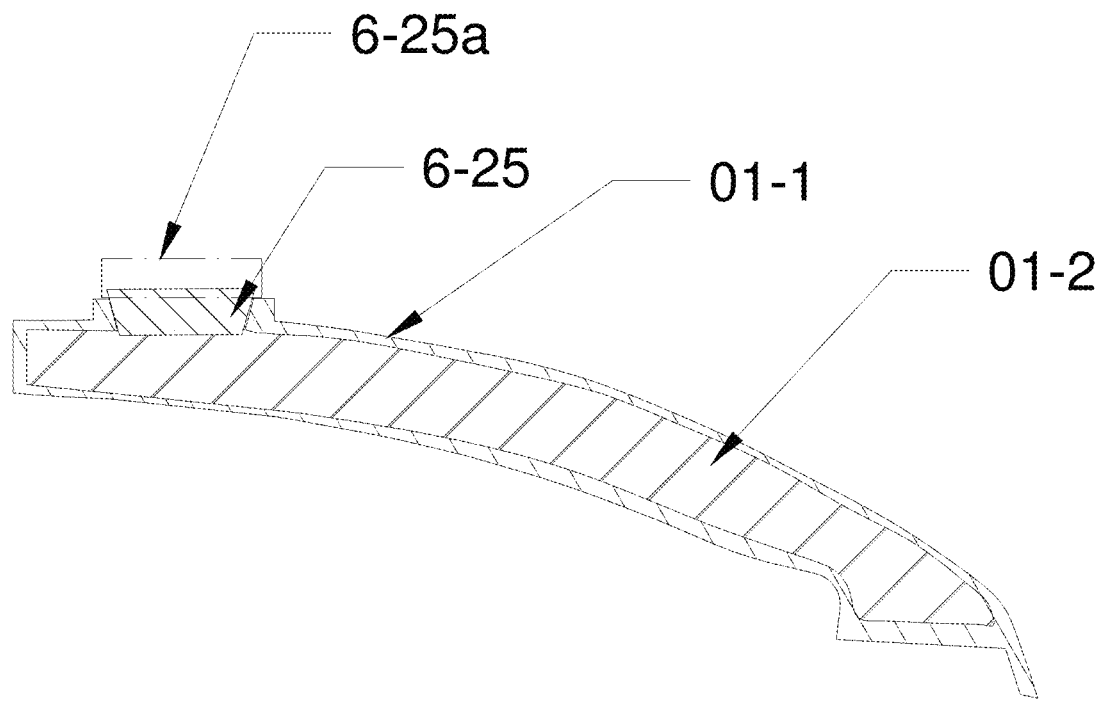
FIG. 16 shows a schematic state diagram of a skin layer to be treated that is embedded in a patching recess according to an example of the disclosure.

After the outer wall of the epidermis layer 6-25 to be treated is attached to the inner wall of the patching recess 01-6, a redundant portion 6-25a is formed along a circumferential edge of a top of the patching recess 01-6 as shown in FIG. 16.

The treatment method further includes:
the redundant portion 6-25a is excised along the circumferential edge of the top of the patching recess 01-6.

After the step that the redundant portion 6-25a is excised, the treatment method further includes:
residual debris is cleared along the circumferential edge of the top of the patching recess 01-6.

Specifically, in this example, when the outer wall of the epidermis layer 6-25 to be treated is attached to the inner wall of the patching recess 01-6, the outer wall of the epidermis layer to be treated and the inner wall of the patching recess are at the first preset temperature. After attachment, the redundant portion 6-25a is formed along the circumferential edge of the top of the patching recess 01-6, a removal station 5 is further arranged above the first machining area 01-3, the removal station 5 includes a removal assembly, and the removal assembly includes a cutter. The cutter is controlled to rotate along an edge of the top of the patching recess 01-6, so as to excise the redundant portion 6-25a. After excising the redundant portion 6-25a, some debris still exists. The removal assembly includes a high-density foam and an injection assembly for injecting a cleaning solution (butanone) into the high-density foam. The high-density foam is controlled to be attached to a place over the redundant portion 6-25a subjected to removal, and the high-density foam is controlled to rotate through two circles, so as to clear debris generated after the redundant portion 6-25a is excised.

Figure 1A:
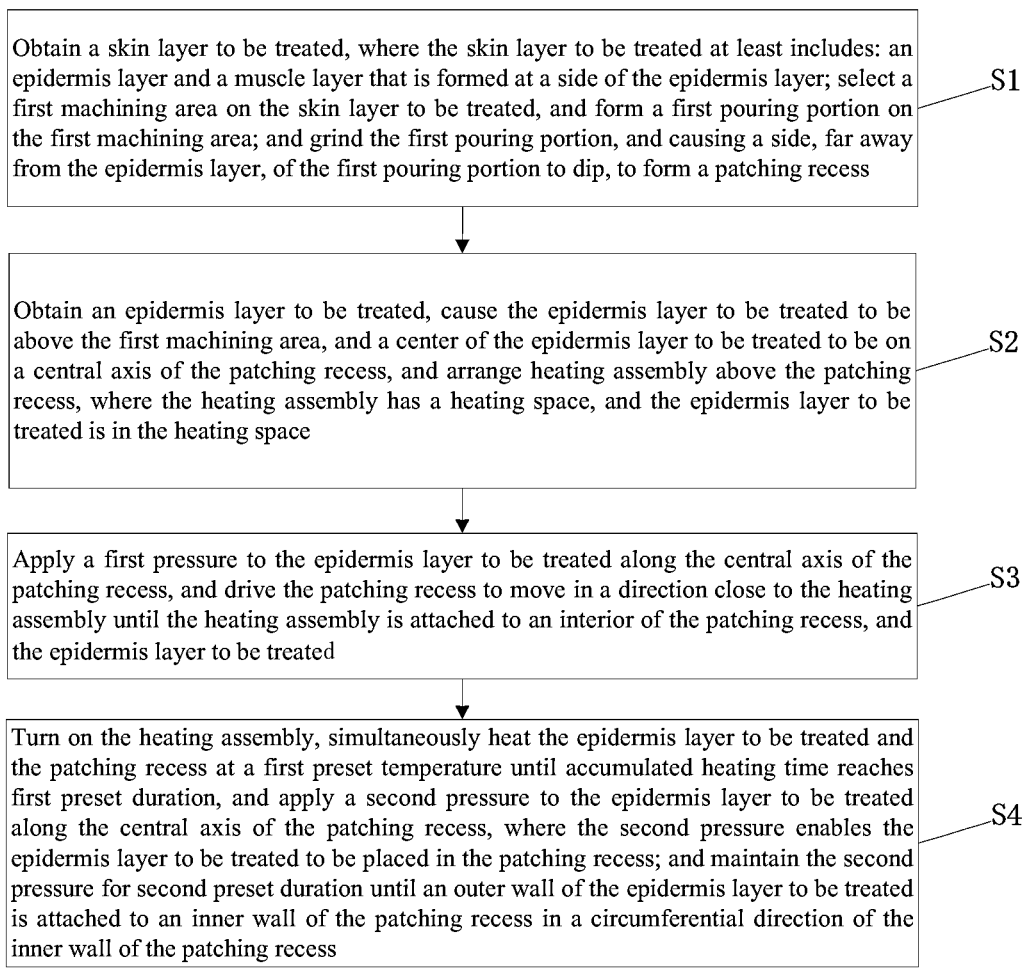
FIG. 1a shows a flowchart of a method according to an example of the disclosure.
Figure 1B:
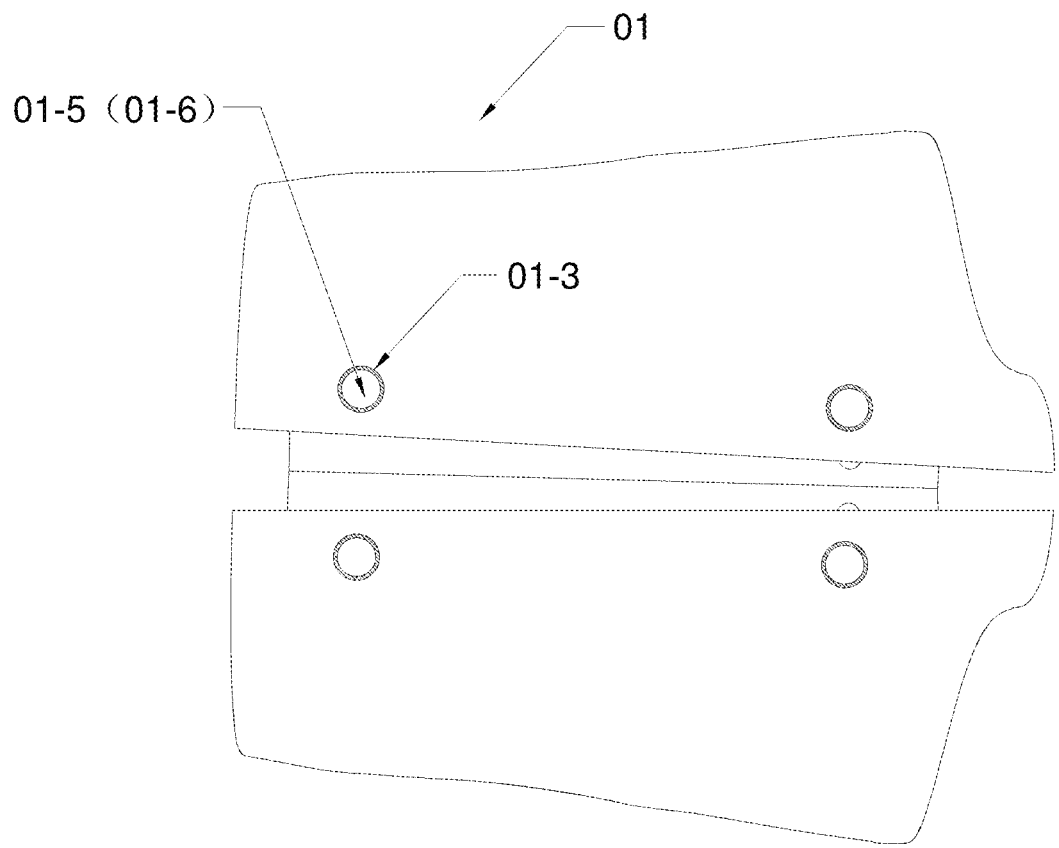
FIG. 1b shows a schematic structural diagram I of a skin layer to be treated according to an example of the disclosure.
Figure 1C:
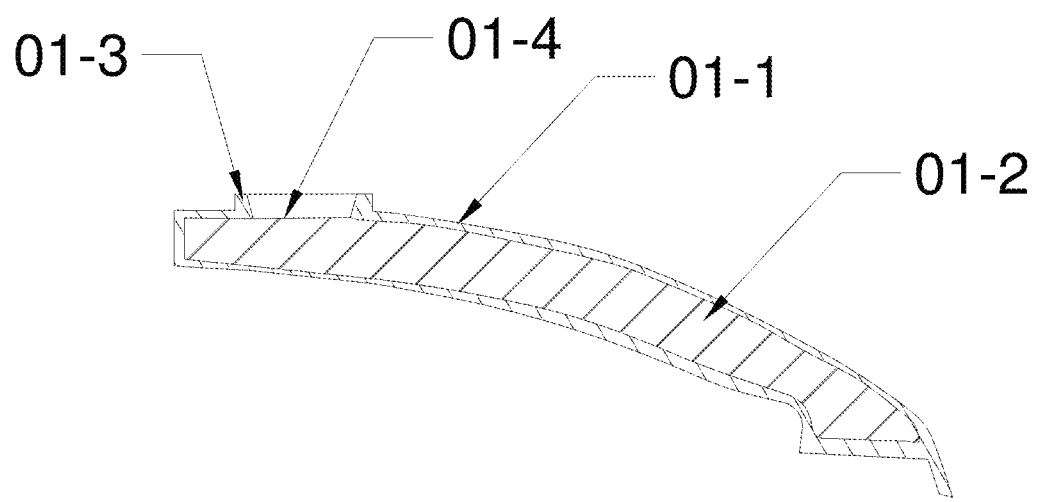
FIG. 1c shows a schematic structural diagram II of a skin layer to be treated according to an example of the disclosure.
Figure 1D:
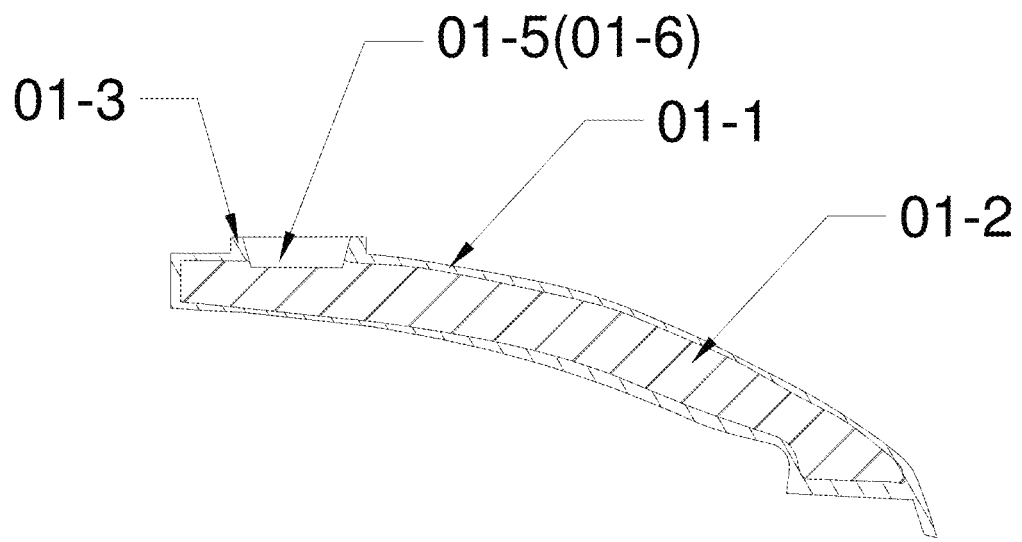
FIG. 1d shows a schematic structural diagram III of a skin layer to be treated according to an example of the disclosure.
Figure 2:
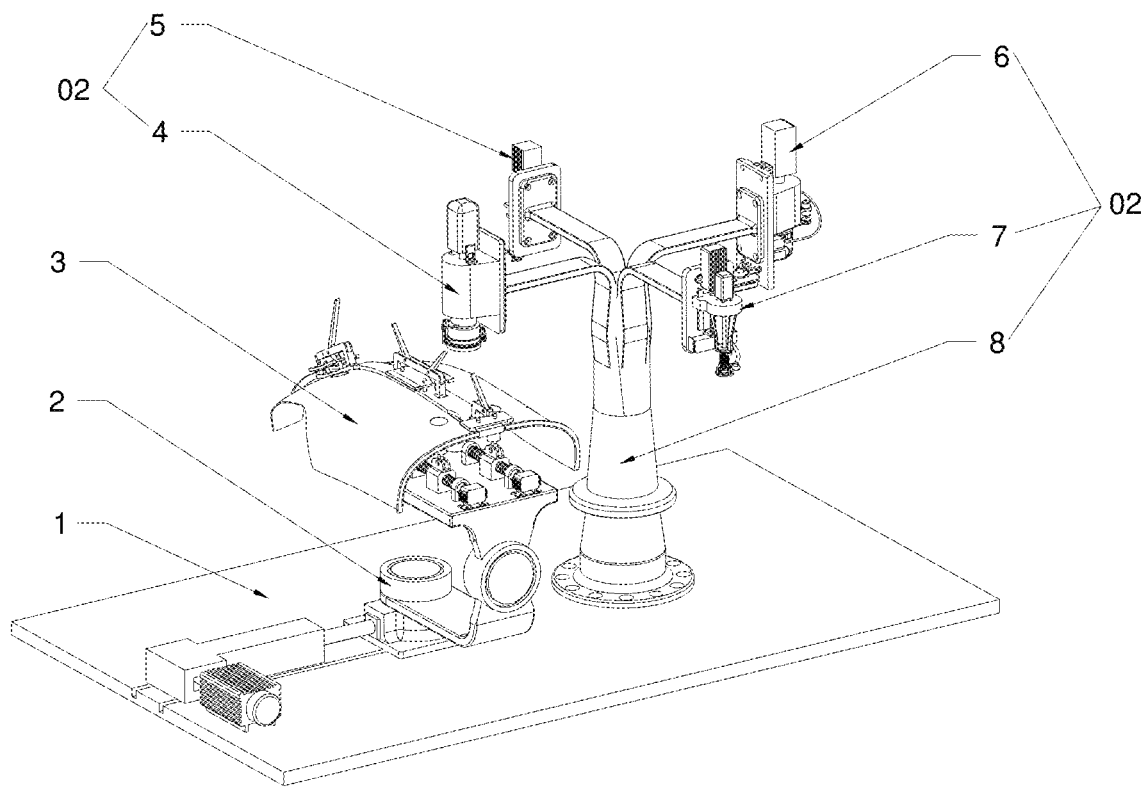
FIG. 2 shows a schematic diagram of a rotary operation table mounted on a base according to an example of the disclosure.

A skin manufacturing post-treatment method for an automobile collision dummy according to this example is implemented based on a device below. As shown in FIG. 2, the device includes:

a base 1, where the base 1 has a mounting surface;

an adjustment mechanism 2, where the adjustment mechanism 2 is mounted on the mounting surface and has a mounting position for a dummy skin (that is, a skin layer 01 to be treated) to be mounted, and a spatial position of the mounting position is adjustable; and the dummy skin is made through an injection molding process; and a post-treatment device 02, where post-treatment device 02 is mounted on the mounting surface and located at a side of the adjustment mechanism 2, and the post-treatment device 02 includes a rotary operation table 8 as shown in FIGS. 2 and 3. A cutting station 4, a grinding station 7, a to-be-treated epidermis layer station 6 and a removal station 5 are sequentially arranged on the rotary operation table 8 in a circumferential direction, and the rotary operation table 8 is configured to place the stations over the mounting position in turn. The cutting station 4 is configured to cut an injection molding residual material on a surface of the dummy skin, the grinding station 7 is configured to grind a cut position to form a patching recess 01-6, and an opening end of the patching recess 01-6 is a large-diameter end. The to-be-treated epidermis layer station 6 is configured to fill the patching recess 01-6 with and weld the epidermis layer 6-25 to be treated, and the removal station 5 is configured to perform removal on the epidermis layer 6-25 to be treated.

With reference to FIGS. 3, 4a, 4b, 4c and 5, the cutting station 4 includes a second support plate 8-4a, and a second lifting driving assembly 4-1 and a cutting device shell 4-2 are arranged on second support plate 8-4a. A drive end of the second lifting driving assembly 4-1 penetrates into the cutting device shell 4-2. A cutting assembly 4-2' is mounted at the drive end of the second lifting driving assembly 4-1, the cutting assembly 4-2' includes a direct-acting sleeve 4-3 connected to the drive end of the second lifting driving assembly 4-1 as shown in FIGS. 4 and 5, and an upper rotary ring 4-4 is rotatably connected at the other end of the direct-acting sleeve 4-3. An upper rotary ring servo motor 4-5 is arranged on an outer side wall of the direct-acting sleeve 4-3, an upper rotary ring servo motor speed reducer 4-6 is mounted at a drive end of the upper rotary ring servo motor 4-5, and a drive end of the upper rotary ring servo motor speed reducer 4-6 is connected to the upper rotary ring 4-4 through belt transmission. When the upper rotary ring servo motor 4-5 rotates, the upper rotary ring 4-4 also rotates under the action of belt transmission. An outer wall of the upper rotary ring 4-4 is provided with a lower rotary ring servo motor 4-8, a drive end of the lower rotary ring servo motor 4-8 is connected to a lower rotary ring servo motor speed reducer 4-9, and the lower rotary ring servo motor speed reducer 4-9 is connected to the lower rotary ring 4-7 through belt transmission. The lower rotary ring 4-7 is rotatably connected below the upper rotary ring 4-4. A part of the lower rotary ring 4-7 sleeves an exterior of the upper rotary ring 4-4. When the drive end of the lower rotary ring servo motor 4-8 rotates, the lower rotary ring 4-7 also rotates under the action of belt transmission. Since the lower rotary ring servo motor 4-8 is fixed to the upper rotary ring 4-4, when the upper rotary ring 4-4 rotates, the lower rotary ring 4-7 also rotates synchronously even if the lower rotary ring servo motor 4-8 is not turned on.

A mounting support is mounted at the outer wall of the upper rotary ring 4-4, and a copper wire tensioning wheel 4-14 that is configured to wind a copper wire 4-16 is arranged on the mounting support. The copper wire tensioning wheel 4-14 may rotate around its own central axis, and an extension direction of the central axis is a vertical direction. A copper wire inlet hole 4-15 is provided in a side wall of the upper rotary ring 4-4, and a bottom of the upper rotary ring 4-4 is provided with a copper wire tractor 4-13, as shown in FIG. 5. The copper wire tractor 4-13 includes a first traction portion and a second traction portion, the first traction portion and the second traction portion extend in a direction far away from the inner wall of the upper rotary ring 4-4, and the other ends of the first traction portion and the second traction portion are provided with copper wire passing holes respectively. The two copper wire passing holes form a guide channel for the copper wires 4-16 to pass therethrough, so as to prevent the copper wire 4-16 from being broken when extended or shortened. A copper wire heating body 4-12 is arranged on a bottom of an inner wall of the lower rotary ring 4-7, as shown in FIG. 5, the copper wire heating body 4-12 and the copper wire tractor 4-13 are on the same horizontal plane, a free end of the copper wire 4-16 is connected to the copper wire heating body 4-12, and the copper wire heating body 4-12 is configured to heat the copper wire 4-16. When the lower rotary ring 4-7 rotates, the copper wire heating body 4-12 pulls the copper wire 4-16 to correspondingly extend or shorten the copper wire 4-16 in a cavity of the lower rotary ring 4-7, thus forming envelope circles that have different diameters for cutting an epidermis layer 01-1 and a muscle layer 01-2 on the injection molding residual material.

A use process of the to-be-treated epidermis layer station 6 includes: after the cut position is ground to form the frustum-shaped patching recess 01-6, the frustum-shaped patching recess 01-6 formed is subjected to skin patching, the to-be-treated epidermis layer station 6 is rotated to be over the mounting position by using the rotary operation table 8, as shown in FIGS. 6, 10 and 11, and a drive end of a first lifting driving assembly 6-1 moves in the vertical direction. An adsorption assembly 6-11' is mounted at the drive end of the first lifting driving assembly 6-1, and the adsorption assembly 6-11' includes a central vacuum adsorption arm 6-12 connected to the drive end of the first lifting driving assembly 6-1. A side of the central vacuum adsorption arm 6-12 is provided with a vacuum pump connection opening 6-12b, the vacuum pump connection opening 6-12b is connected to a vacuum tube 6-3, the other end of the vacuum tube 6-3 is connected to a first vacuum pump 6-11, and the first vacuum pump 6-11 is configured to perform vacuumizing, so as to make an interior of the central vacuum adsorption arm 6-12 in a negative pressure environment, and generate vertical upward adsorption force. An end, far away from the drive end of the first lifting driving assembly 6-1, of the central vacuum adsorption arm 6-12 is connected to a shaping sheet 6-27, as shown in FIG. 11, the shaping sheet 6-27 has a shape of a hollowed cone frustum, and a large-diameter end and a small-diameter end of the shaping sheet 6-27 face upwards and downwards respectively. A generatrix slope of the shaping sheet 6-27 is 45°, and an end, relatively close to the shaping sheet 6-27, of the central vacuum adsorption arm 6-12 is provided with an elastic turnover diaphragm 6-26 in an interference fit manner. A welding assembly housing 6-2 is further arranged on the first support plate 8-4c, a side of the welding assembly housing 6-2 is provided with a first opening, and the first opening is configured to provide a channel for the vacuum tube 6-3. A first mounting block is arranged at a bottom end of an interior of the welding assembly housing 6-2, a servo motor support frame 6-4 is arranged on the first mounting block, and an end of the servo motor support frame 6-4 extends outside from the first opening. A welding mechanism servo motor 6-9 is arranged on the servo motor support frame 6-4, a drive end of the welding mechanism servo motor 6-9 is connected to a welding mechanism servo motor speed reducer 6-10, an end of the first mounting block is connected to a welding mechanism bearing 6-5, the welding mechanism bearing 6-5 is connected to the welding mechanism servo motor speed reducer 6-10 through belt transmission, and a heating assembly 6-6' is connected to a bottom end of the welding mechanism bearing 6-5. When the welding mechanism servo motor 6-9 rotates, the heating assembly 6-6' also rotates simultaneously. The heating assembly 6-6' includes heating units 6-6 that are fixedly connected to the bottom end of the welding mechanism bearing 6-5 and are distributed in a circular ring shape, and a plurality of elastic reeds 6-13 are connected to a bottom end of the heating unit 6-6. The plurality of elastic reeds 6-13 are evenly distributed on the same circumference at equal intervals around an axial direction of the heating unit 6-6, and jointly form a accommodation space 6-13a, and the heating units 6-6 are configured to heat the plurality of elastic reeds 6-13 together. In this example, two elastic reeds 6-13 are provided, free ends of the elastic reeds 6-13 are heating portions 6-13b, and the heating portions 6-13b are bent towards the interior of the accommodation space 6-13a, to form the frustum-shaped heating space 6-13e. A taper of the heating space 6-13e is equal to a taper of the patching recess 01-6, and is 45°, and the heating portion 6-13b has a first heating surface 6-13c and a second heating surface 6-13d. The first heating surface 6-13c is configured to shape and heat the epidermis layer 6-25 to be heated that is placed in the heating space 6-13e, and the second heating surface 6-13d is configured to heat an inner wall of the patching recess 01-6.

A surface, relatively far away from the first lifting driving assembly 6-1, of the first support plate 8-4c is provided with a to-be-treated epidermis layer allocating assembly 6-15. As shown in FIGS. 8 and 9, a first square hole extending in a horizontal direction is provided below the first support plate 8-4c, the to-be-treated epidermis layer allocating assembly 6-15 includes a first mounting plate arranged in the first square hole, a movement member 6-18 that is movable in the horizontal direction is slidably arranged on the first mounting plate, and a to-be-treated epidermis layer allocating direct-acting motor 6-17 that drives the movement member 6-18 to move is also arranged on the first mounting plate. A to-be-treated epidermis layer containment recess 6-18b is provided in the movement member 6-18, and a bottom of the to-be-treated epidermis layer containment recess 6-18b is provided with a to-be-treated epidermis layer glue containment recess 6-18c. A glue injection assembly 6-20 is further arranged on the first support plate 8-4c, the glue injection assembly 6-20 is described in the method, the glue injection assembly 6-20 includes a glue injection direct-acting pump 6-21, an output end of the glue injection direct-acting pump 6-21 is connected to a glue delivery tube 6-21a, and an end of the glue delivery tube 6-21a is in communication with the to-be-treated epidermis layer glue containment recess 6-18c, so as to deliver the glue into the to-be-treated epidermis layer glue containment recess 6-18c. A to-be-treated epidermis layer spacer diversion bin 6-18a is further provided in the movement member 6-18, and the to-be-treated epidermis layer spacer diversion bin 6-18a and the to-be-treated epidermis layer containment recess 6-18b are arranged in the horizontal direction.

Figure 14:
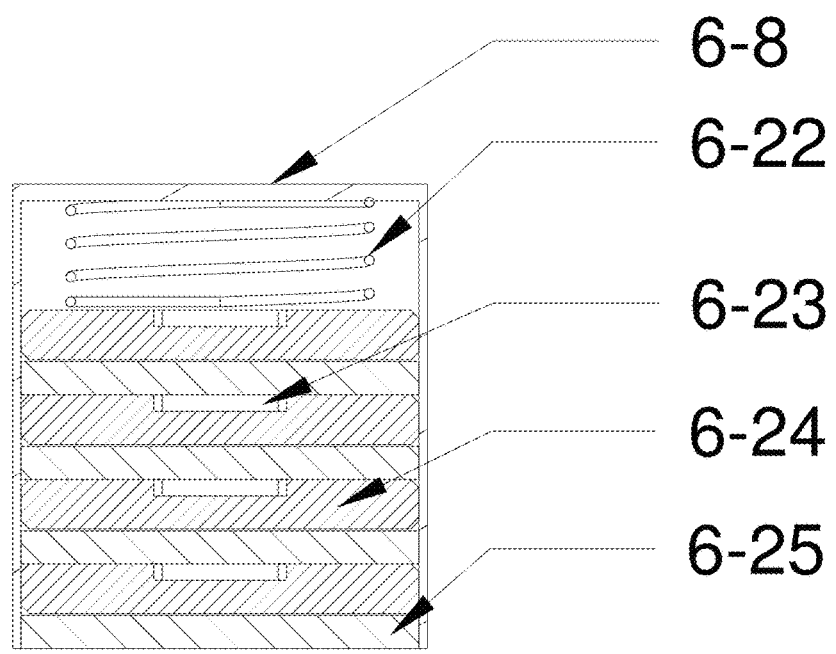
FIG. 14 shows a schematic diagram of a to-be-treated epidermis layer spacer recovery bin according to an example of the disclosure.

A to-be-treated epidermis layer bin 6-8 is further arranged on the first support plate 8-4c, as shown in FIG. 14, multiple epidermis layers 6-25 to be treated are contained inside the to-be-treated epidermis layer bin 6-8, and to-be-treated epidermis layer spacers 6-24 are arranged between every two adjacent epidermis layers 6-25 to be treated. A to-be-treated epidermis layer bin release spring 6-22 that is stretchable and retractable in the vertical direction is arranged at a top end of the to-be-treated epidermis layer bin 6-8, the other end of the to-be-treated epidermis layer bin release spring 6-22 abuts against the to-be-treated epidermis layer spacer 6-24, and the to-be-treated epidermis layer bin release spring 6-22 is configured to push the epidermis layer 6-25 to be treated in the to-be-treated epidermis layer bin 6-8 and the to-be-treated epidermis layer spacer 6-24 to move downwards.

Figure 12:
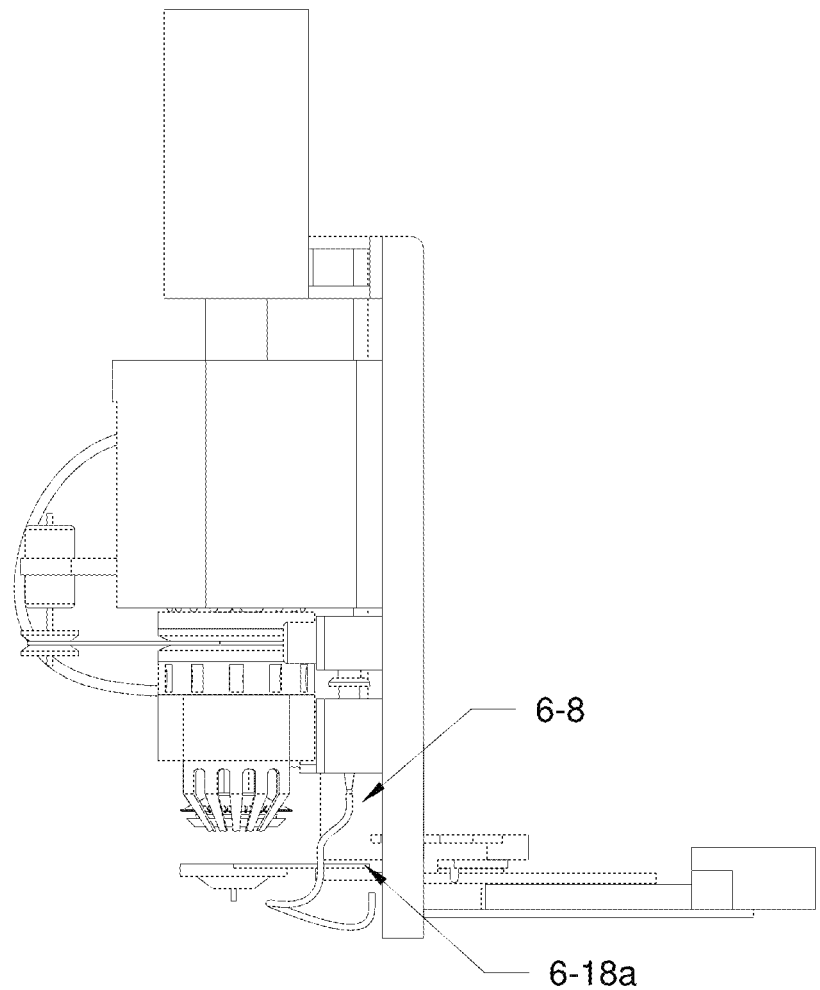
FIG. 12 shows a schematic diagram of a movement member at a first station according to an example of the disclosure.
Figure 13:
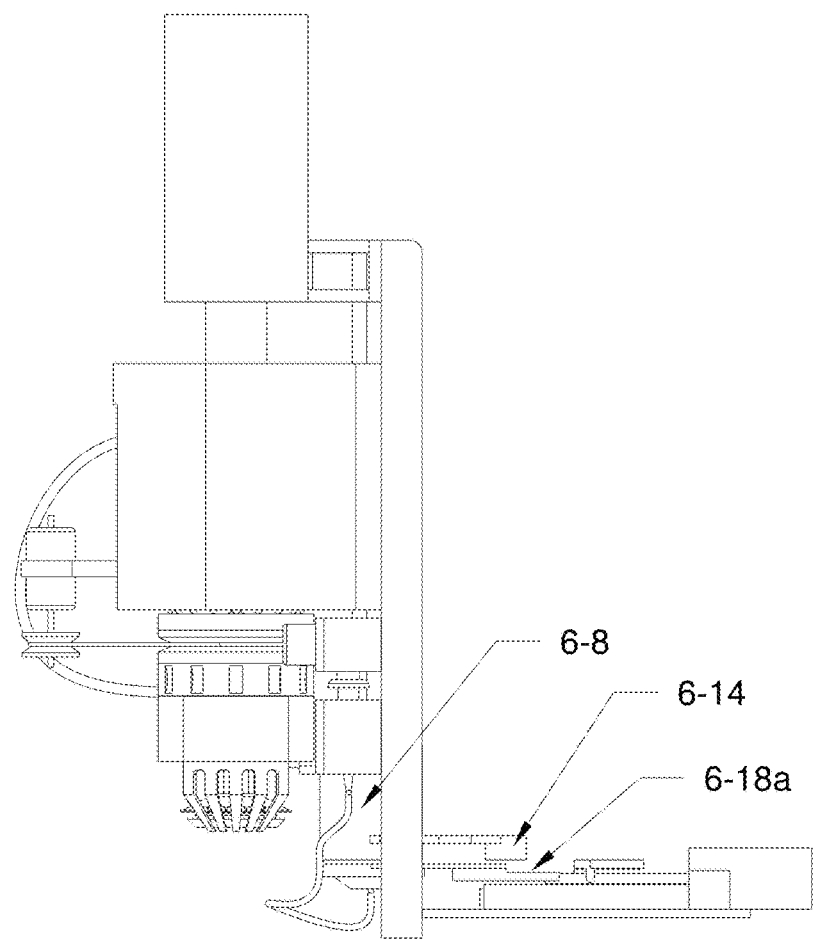
FIG. 13 shows a schematic diagram of a movement member at a second station according to an example of the disclosure.

The movement member 6-18 has a first station and a second station as shown in FIGS. 12 and 13. Under the condition that the movement member 6-18 is at the first station, the to-be-treated epidermis layer containment recess 6-18b and the to-be-treated epidermis layer glue containment recess 6-18c are both located under the adsorption assembly 6-11', and the to-be-treated epidermis layer spacer diversion bin 6-18a is located below the to-be-treated epidermis layer bin 6-8, to contain the to-be-treated epidermis layer spacer 6-24. Under the condition that the movement member is at the second station, the to-be-treated epidermis layer containment recess 6-18b and the to-be-treated epidermis layer glue containment recess 6-18c are located below the to-be-treated epidermis layer bin 6-8, to contain the epidermis layer 6-25 to be treated.

A to-be-treated epidermis layer spacer magnetic frame 6-14 is further arranged on the first support plate 8-4c, as shown in FIGS. 8, 9 and 14, a first magnetic attraction member 6-23 is arranged on each to-be-treated epidermis layer spacer 6-24, and the to-be-treated epidermis layer spacer magnetic frame 6-14 and the first magnetic attraction member 6-23 have opposite magnetism. Under the condition that the movement member 6-18 is at the second station, the to-be-treated epidermis layer spacer diversion bin 6-18a is located under the to-be-treated epidermis layer spacer magnetic frame 6-14, and is configured to suck up the to-be-treated epidermis layer spacer 6-24 in the to-be-treated epidermis layer spacer diversion bin 6-18a.

A to-be-treated epidermis layer spacer stopper member 6-16 is further arranged on the movement member 6-18, the to-be-treated epidermis layer spacer stopper member 6-16 has a partially protruding scraping portion, and a to-be-treated epidermis layer spacer recovery bin 6-19 is further provided at a side surface of the first mounting plate. The to-be-treated epidermis layer spacer stopper member 6-16 is configured to scrape the to-be-treated epidermis layer spacer 6-24 that is adsorbed to the to-be-treated epidermis layer spacer magnetic frame 6-14 into the to-be-treated epidermis layer spacer recovery bin 6-19.

During use as shown in FIGS. 12 and 13, under the condition that the movement member 6-18 moves from the first station to the second station, the to-be-treated epidermis layer spacer magnetic frame 6-14 sucks up the to-be-treated epidermis layer spacer 6-24 located in the to-be-treated epidermis layer spacer diversion bin 6-18a. Under the condition that the movement member 6-18 moves from the second station to the first station, the to-be-treated epidermis layer spacer stopper member 6-16 scrapes into the to-betreated epidermis layer spacer recovery bin 6-19 the to-be-treated epidermis layer spacer 6-24 that is sucked up.

Figure 7A:
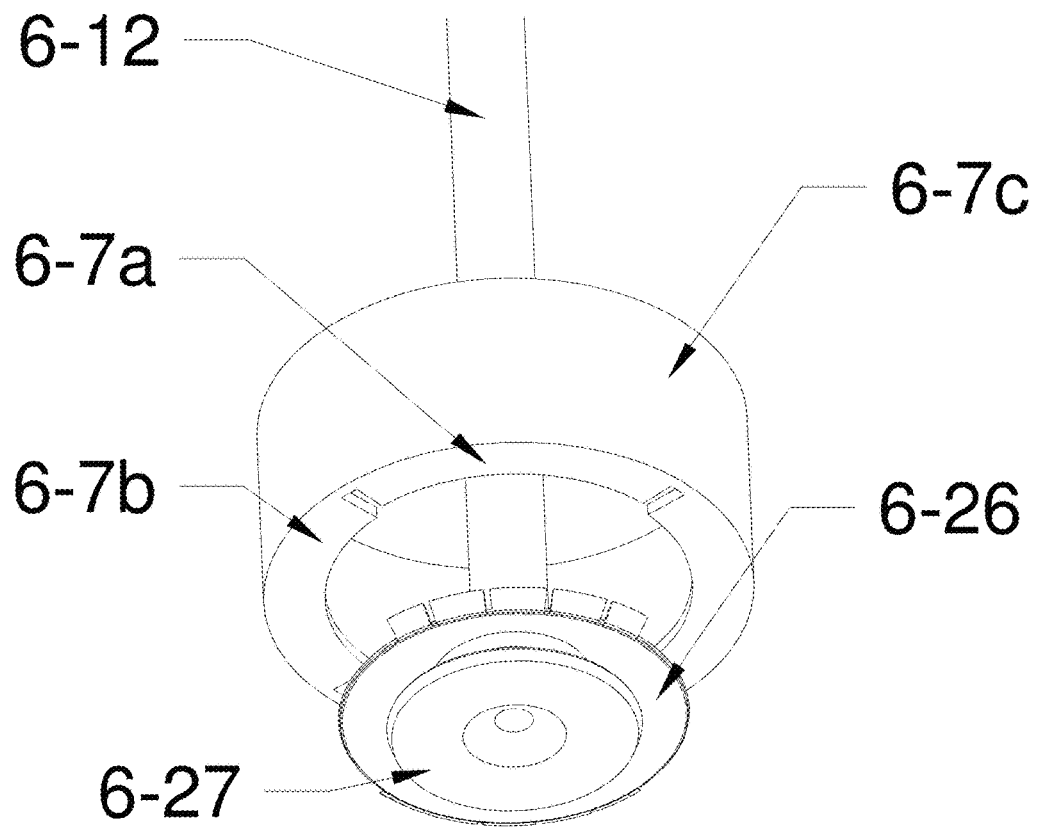
FIG. 7a shows a schematic diagram I of an elastic turnover diaphragm ring according to an example of the disclosure.
Figure 7B:
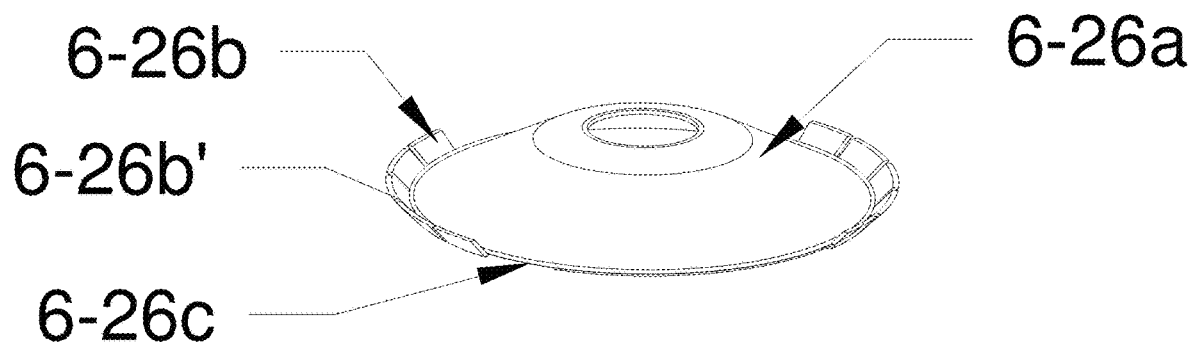
FIG. 7b shows a schematic diagram II of an elastic turnover diaphragm ring according to an example of the disclosure.

As shown in FIGS. 7a and 7b, the elastic turnover diaphragm 6-26 includes a turnover diaphragm body 6-26a, a turnover center ring 6-26c is arranged at the periphery of the turnover diaphragm body 6-26a, and an outer edge of the turnover center ring 6-26c is provided with multiple turnover skirts 6-26b. The multiple turnover skirts 6-26b are symmetrically arranged, and the multiple turnover skirts 6-26b jointly form the first circular ring 6-26b'. The turnover skirt 6-26b has a first state and a second state. When the turnover skirt is in the first state, an included angle between each of the turnover skirt 6-26b and the horizontal plane is 0°, and an outer diameter of the first circular ring 6-26b' is a first diameter. When the turnover skirt is in the second state, each of the turnover skirts 6-26b turns upwards and forms an angle of 45° with the horizontal plane, an outer diameter of the first circular ring 6-26b' is a second diameter, and the first diameter is greater than the second diameter. FIG. 7b is a schematic structural diagram of the first circular ring 6-26b' in the second state, and the elastic turnover diaphragm ring 6-7 is arranged at a bottom of the heating unit 6-6, as shown in FIG. 7a. The elastic turnover diaphragm ring 6-7 is configured to switch the turnover skirt 6-26b between the first state and the second state, the elastic turnover diaphragm ring 6-7 includes a ring body 6-7c, and an inner wall of the ring body 6-7c is provided with a first group of baffle sheets 6-7a and a second group of baffle sheets 6-7b. The first group of baffle sheets 6-7a include two first baffle sheets, and the second group of baffle sheets 6-7b include two second baffle sheets. The two first baffle sheets and the two second baffle sheets are arranged at intervals, free ends of the baffle sheets are cambered, the free ends of the two first baffle sheets are located on the same circumference with a diameter greater than the first diameter, the free ends of the two second baffle sheets are located on the same circumference with a diameter equal to the second diameter, and the first group of baffle sheets 6-7a and the second group of baffle sheets 6-7b have greater rigidity than the elastic turnover diaphragm 6-26.

During use, when the first frustum-shaped patching recess 01-6 needs to be patched, the glue injection assembly 6-20 delivers the glue into the to-be-treated epidermis layer glue containment recess 6-18c. After the glue is delivered, the drive end of the to-be-treated epidermis layer allocating direct-acting motor 6-17 pushes the movement member 6-18 to move, and causes the movement member 6-18 to be located at the second position, the to-be-treated epidermis layer containment recess 6-18b and the to-be-treated epidermis layer glue containment recess 6-18c are located under the to-be-treated epidermis layer bin 6-8, the epidermis layer 6-25 to be treated in the to-be-treated epidermis layer bin 6-8 falls into the to-be-treated epidermis layer containment recess 6-18b under the action of the to-be-treated epidermis layer bin release spring 6-22, and a portion, not in contact with the to-be-treated epidermis layer containment recess 6-18b, of the epidermis layer 6-25 to be treated comes into contact with the glue in the to-be-treated epidermis layer glue containment recess 6-18c, that is, the epidermis layer 6-25 to be treated that has one surface coated with the glue is formed. A thickness of the epidermis layer 6-25 to be treated is 2 mm, and a distance between a lower end of the to-be-treated epidermis layer bin 6-8 and an upper bearing surface of the to-be-treated epidermis layer glue containment recess 6-18c is 2 mm, such that it can be guaranteed that merely the epidermis layer 6-25 to be treated other than the to-be-treated epidermis layer spacer 6-24 in the to-be-treated epidermis layer bin 6-8 can be taken away when the movement member 6-18 is switched to the first position from the second station. When the movement member 6-18 is switched from the second station to the first station, the to-be-treated epidermis layer spacer 6-24 falls into the to-be-treated epidermis layer spacer diversion bin 6-18a under the action of magnet attraction, and a height of the to-be-treated epidermis layer spacer 6-24 is equal to a height of the to-be-treated epidermis layer spacer diversion bin 6-18a in order to prevent a next the epidermis layer 6-25 to be treated from getting out of the to-be-treated epidermis layer bin 6-8. Particularly, in this example, the thickness of the to-be-treated epidermis layer spacer 6-24 is 3 mm, and the height of the to-be-treated epidermis layer spacer diversion bin 6-18a is 3 mm. Since a distance between an axis of a circle defined by the elastic reeds 6-13 and a central axis of the to-be-treated epidermis layer bin 6-8 is equal to a distance between the central axis of the to-be-treated epidermis layer bin 6-8 and a central axis of the to-be-treated epidermis layer spacer diversion bin 6-18a, the epidermis layer 6-25 to be treated runs to be under the elastic reed 6-13 when the to-be-treated epidermis layer spacer 6-24 falls into the to-be-treated epidermis layer spacer diversion bin 6-18a.

In this case, the movement member 6-18 is switched from the second station to the first station. When the movement member is at the first station, the to-be-treated epidermis layer containment recess 6-18b and the to-be-treated epidermis layer glue containment recess 6-18c are under the adsorption assembly 6-11'. Since a diameter of the circular ring formed by the free ends of the elastic reeds 6-13 is 20 mm, and a diameter of the epidermis layer 6-25 to be treated is 24 mm, it is necessary to use the elastic turnover diaphragm 6-26 to expand a circumference formed by the heating portions 6-13b of the elastic reed 6-13. The first lifting driving assembly 6-1 is turned on, and drives the adsorption assembly 6-11' to move in a direction close to the to-be-treated epidermis layer containment recess 6-18b, the first vacuum pump 6-11 and the heating unit 6-6 are turned on simultaneously, the turnover skirts 6-26b are in the first state when the adsorption assembly 6-11 moves downwards, and expand the diameter of the circular ring formed by the free ends of the elastic reed 6-13 to the first diameter of 32 mm, and then the adsorption assembly 6-11' continues moving downwards until the epidermis layer 6-25 to be treated is sucked out of the to-be-treated epidermis layer glue containment recess 6-18c by the adsorption assembly 6-11'. After sucking, the drive end of the first lifting driving assembly 6-1 drives the epidermis layer 6-25 to be treated to move in an opposite direction, and transports the epidermis layer 6-25 to be treated into the accommodation space 6-13a. During transportation, since the diameter of the circumference formed by the heating portions 6-13b of the elastic reed 6-13 is greater than the diameter of the epidermis layer 6-25 to be treated, the epidermis layer 6-25 to be treated can smoothly enter the accommodation space 6-13a. During a process of the epidermis layer 6-25 to be treated entering the accommodation space 6-13a, the turnover skirt 6-26b at the periphery of the elastic turnover diaphragm 6-26 is still in the first state, the heating portion 6-13b of the elastic reed 6-13 cannot heat the skin patching material due to a failure to be attached to the epidermis layer 6-25 to be treated, the drive end of the first lifting driving assembly 6-1 continues driving the elastic reed 6-13 into the elastic turnover diaphragm ring 6-7 accordingly, and a reversing space is formed inside the elastic turnover diaphragm ring 6-7, as shown in FIG. 17a. The turnover skirt 6-26b in the first state directly corresponds to the first group of baffle sheets 6-7a, a formed diameter being 34 mm of the first group of baffle sheets 6-7a is greater than the first diameter of 32 mm, and the turnover skirt 6-26b in the first state can smoothly enter into the reversing space. Then, the welding mechanism servo motor 6-9 is turned on, to rotate the elastic turnover diaphragm ring 6-7, and further cause the second group of baffle sheets 6-7b correspond to the turnover skirt 6-26b in the first state, and then the first lifting driving assembly 6-1 is controlled to drive the adsorption assembly 6-11' to drive the epidermis layer 6-25 to be treated to move downwards. During the downward movement, the turnover skirt 6-26b in the first state is switched from the first state to the second state under the action of baffling of the second group of baffle sheets 6-7b, and the turnover skirt 6-26b is switched to the second diameter from the first diameter, and reaches the second state. The adsorption assembly 6-11' keeps moving downwards, the welding mechanism servo motor 6-9 is turned on, and the heating assembly 6-6' keeps rotating continuously, the first heating surface 6-13c is attached to the epidermis layer 6-25 to be heated in this case, so as to heat and shape the epidermis layer 6-25 to be heated, and the spatial position of the mounting position is adjusted to drive a chest skin to move vertically upwards. Since the thickness of the heating portion 6-13b of the elastic reed 6-13 is 1 mm, it is necessary to guarantee that a lower end of the epidermis layer 6-25 to be treated in the accommodation space 6-13a has a distance of 1 mm from a lower end of the elastic reed 6-13 (that is, the epidermis layer 6-25 to be treated is above the elastic reed 6-13). If a lower end of the epidermis layer 6-25 to be treated is flush with a lower end of the elastic reed 6-13, a large diameter of the frustum-shaped patching recess 01-6 is expanded in size. Thus, in order to guarantee that the size of the large diameter of the frustum-shaped patching recess 01-6 keeps unchanged, the distance between the lower end of the epidermis layer 6-25 to be treated in the accommodation space 6-13a and the lower end of the elastic reed 6-13 should be reserved by 1 mm. Since the heating portion 6-13b of the elastic reed 6-13 extends into a gate by 2 mm, that is, a vertical height of the frustum-shaped patching recess 01-6 is 2 mm, it can be guaranteed that a skin of the gate and the epidermis layer 6-25 to be treated simultaneously form cone frustums that have upper bottom surface diameters of 24 mm, lower bottom surface diameters of 20 mm, and a generatrix slope 45°. The gate and the epidermis layer 6-25 to be treated are simultaneously heated, and then the epidermis layer 6-25 to be treated is rotated and molten at a high temperature for 10 s by the heating portion 6-13b, then a mounting position is adjusted in spatial position immediately, so as to drive the chest skin to move vertically downwards away from the heating portion 6-13b, and then the drive end of the first lifting driving assembly 6-1 drives the epidermis layer 6-25 to be treated that is heated and shaped into a frustum shape to move in a direction (that is, upward) away from the patching recess 01-6. In a process of upward movement, the turnover skirt 6-26b in the second state is switched from the second state to the first state under the action of baffling of the second group of baffle sheets 6-7b, and the second diameter of the turnover skirt 6-26b is switched to the first diameter. Then the first lifting driving assembly 6-1 drives the epidermis layer 6-25 to be heated to move in a direction close to the frustum-shaped patching recess 01-6. During movement, the turnover skirt in the first state expands a diameter of a circular ring that is formed by the free ends of the elastic reeds 6-13 to the first diameter, and in this way, the epidermis layer 6-25 to be heated that is shaped can be transported from the accommodation space 6-13a into the frustum-shaped patching recess 01-6 heated. When an upper surface of the epidermis layer 6-25 to be treated overlaps an upper surface of a skin layer of the frustum-shaped patching recess 01-6, the adsorption assembly 6-11' keeps at a current position for 20 s, the epidermis layer 6-25 to be treated that is molten and the frustum-shaped patching recess 01-6 molten are fully bonded to each other and cooled, the first vacuum pump 6-11 is turned off, the adsorption assembly 6-11' releases the epidermis layer 6-25 to be treated, the to-be-treated epidermis layer station 6 is resumed to an initial state, and a circle of skin layer supplementary material welding process is completed.

In a process of resetting, as shown in FIGS. 12 and 13, the drive end of the to-be-treated epidermis layer allocating direct-acting motor 6-17 resumes the movement member 6-18 to the first station from the second station. In a process of resuming to the first station, the to-be-treated epidermis layer spacer 6-24 in the to-be-treated epidermis layer spacer diversion bin 6-18a is gradually transported to a position below the to-be-treated epidermis layer spacer magnetic frame 6-14. Since the to-be-treated epidermis layer spacer magnetic frame 6-14 and the first magnetic attraction member 6-23 have opposite magnetism, the to-be-treated epidermis layer spacer magnetic frame 6-14 can suck up the to-be-treated epidermis layer spacer 6-24, then the to-be-treated epidermis layer spacer 6-24 on the to-be-treated epidermis layer spacer magnetic frame 6-14 is scraped into the to-be-treated epidermis layer spacer recovery bin 6-19 by the scraping portion on the to-be-treated epidermis layer spacer stopper member 6-16, and recovery by the to-be-treated epidermis layer spacer recovery bin 6-19 is completed.

The apparatus simultaneously heats the frustum-shaped patching recess 01-6 and the epidermis layer 6-25 to be treated, and the epidermis layer 6-25 to be treated is heated into a frustum shape. Slopes of the frustum-shaped patching recess 01-6 and the epidermis layer 6-25 to be treated are both 45 degrees, and then the epidermis layer 6-25 to be treated is put into the frustum-shaped patching recess 01-6, such that a contact area between the skin patching material and the frustum-shaped patching recess can be expanded and a binding strength can be enhanced. The state change of the turnover skirt 6-26b on the elastic turnover diaphragm 6-26 can effectively prevent the epidermis layer 6-25 to be treated from being damaged during transportation of the epidermis layer 6-25 to be treated into the accommodation space 6-13a and upward movement.

The heating assembly 6-6' described in the method includes a heating unit 6-6 and a plurality of elastic reeds 6-13 connected to the heating unit 6-6, the heating unit 6-6 is configured to heat the elastic reeds 6-13, and the plurality of elastic reeds 6-13 are distributed on the same circumference, and jointly define an accommodation space 6-13a. Free ends of the elastic reeds 6-13 are heating portions 6-13b, the heating portions 6-13b are bent towards an interior of the accommodation space 6-13a to form a frustum-shaped heating space 6-13e, and a taper of the heating space 6-13e is equal to a taper of the patching recess 01-6. The heating portion 6-13b has a first heating surface 6-13c facing the heating space 6-13e and a second heating surface 6-13d facing away from the heating space 6-13e, the first heating surface 6-13c is configured to shape and heat the epidermis layer 6-25 to be treated that is placed in the heating space 6-13e, and the second heating surface 6-13d is configured to heat the inner wall of the patching recess 01-6.

Specifically, in this example, as shown in FIGS. 6 and 10, the heating assembly 6-6' includes the heating unit 6-6, the heating unit 6-6 is configured to heat the elastic reeds 6-13, and the plurality of elastic reeds 6-13 are distributed on the same circumference, and jointly define the accommodation space 6-13*a*. The free ends of the elastic reeds 6-13 are the heating portions 6-13*b*, the heating portions 6-13*b* are bent towards the interior of the accommodation space 6-13*a* to form the frustum-shaped heating space 6-13*e*, and the taper of the heating space 6-13*e* is equal to the taper of the patching recess 01-6. The heating portion 6-13*b* has the first heating surface 6-13*c* facing the heating space 6-13*e* and the second heating surface 6-13*d* facing away from the heating space 6-13*e*, the first heating surface 6-13*c* is configured to shape and heat the epidermis layer 6-25 to be treated that is placed in the heating space 6-13*e*, and the second heating surface 6-13*d* is configured to heat the inner wall of the patching recess 01-6.

The device further includes the shaping sheet 6-27 arranged in the accommodation space 6-13*a*, and a linear drive device for driving the shaping sheet 6-27 to move to the heating space 6-13*e*. The linear drive device is a linear drive motor in this example, and the shaping sheet 6-27 has a shape of a cone frustum, and the large-diameter end and the small-diameter end of the shaping sheet 6-27 face upwards and downwards respectively, and the generatrix slope of the shaping sheet 6-27 is 45°. The shaping sheet 6-27 is configured to shape the epidermis layer 6-25 to be treated into a frustum shape under cooperation of the first heating surface 6-13*c*.

Further, the device further includes the to-be-treated epidermis layer allocating assembly 6-15 as shown in FIGS. 8 and 9, and the to-be-treated epidermis layer allocating assembly 6-15 includes the movement member 6-18. The to-be-treated epidermis layer containment recess 6-18*b* is provided in the movement member 6-18. The to-be-treated epidermis layer glue containment recess 6-18*c* is provided in the bottom of the to-be-treated epidermis layer containment recess 6-18*b*.

Specifically, in this example, the device further includes the to-be-treated epidermis layer allocating assembly 6-15. The to-be-treated epidermis layer allocating assembly 6-15 includes the first mounting plate, the movement member 6-18 that is movable in the horizontal direction is slidably arranged on the first mounting plate, and the to-be-treated epidermis layer allocating direct-acting motor 6-17 that drives the movement member 6-18 to move is also arranged on the mounting plate. The to-be-treated epidermis layer containment recess 6-18*b* is provided in the movement member 6-18, and the bottom of the to-be-treated epidermis layer containment recess 6-18*b* is provided with the to-be-treated epidermis layer glue containment recess 6-18*c*. The to-be-treated epidermis layer glue containment recess 6-18*c* is configured to contain the glue, so as to coat the epidermis layer 6-25 to be treated in the to-be-treated epidermis layer containment recess 6-18*b*, and form the adhesive layer 6-25*b*. The device further includes the glue injection assembly 6-20, and the glue injection assembly 6-20 is configured to inject the glue into the to-be-treated epidermis layer glue containment recess 6-18*c*.

Further, the post-treatment device 02 further includes the cutting assembly 4-2' as shown in FIGS. 4*a*, 4*b*, 4*c* and 5. The cutting assembly 4-2' includes the direct-acting sleeve 4-3, an end of the direct-acting sleeve 4-3 is rotatably connected to the upper rotary ring 4-4, and an end of the upper rotary ring 4-4 is rotatably connected to the lower rotary ring 4-7. The upper rotary ring servo motor 4-5 is arranged on the direct-acting sleeve 4-3, the lower rotary ring servo motor 4-8 is arranged on the upper rotary ring 4-4, and the upper rotary ring servo motor and the lower rotary ring servo motor are configured to drive the upper rotary ring 4-4 and the lower rotary ring 4-7 to rotate respectively. The outer wall of the upper rotary ring 4-4 is further provided with the copper wire tensioning wheel 4-14 and the copper wire inlet hole 4-15 for the copper wire 4-16 to enter and exit, the inner wall of the lower rotary ring 4-7 is provided with the copper wire tractor 4-13 and the copper wire heating body 4-12, and the copper wire heating body 4-12 is configured to heat the copper wire 4-16. The copper wire 4-16 forms the first cutting portions 4-17 that have different sizes in the inner cavity of the lower rotary ring 4-7 under the condition that the upper rotary ring 4-4 is motionless and the lower rotary ring 4-7 rotates.

Specifically, in this example as shown in FIGS. 4*a* and 5, the cutting assembly 4-2' includes the direct-acting sleeve 4-3, and the upper rotary ring 4-4 is rotatably connected at the other end of the direct-acting sleeve 4-3. The upper rotary ring servo motor 4-5 is arranged on the outer side wall of the direct-acting sleeve 4-3, the upper rotary ring servo motor speed reducer 4-6 is mounted at the drive end of the upper rotary ring servo motor 4-5, and the drive end of the upper rotary ring servo motor speed reducer 4-6 is connected to the upper rotary ring 4-4 through belt transmission. When the upper rotary ring servo motor 4-5 rotates, the upper rotary ring 4-4 also rotates under the action of belt transmission. The outer wall of the upper rotary ring 4-4 is provided with the lower rotary ring servo motor 4-8, the drive end of the lower rotary ring servo motor 4-8 is connected to the lower rotary ring servo motor speed reducer 4-9, and the lower rotary ring servo motor speed reducer 4-9 is connected to the lower rotary ring 4-7 through belt transmission. The lower rotary ring 4-7 is rotatably connected below the upper rotary ring 4-4. A part of the lower rotary ring 4-7 sleeves the exterior of the upper rotary ring 4-4. When the drive end of the lower rotary ring servo motor 4-8 rotates, the lower rotary ring 4-7 also rotates under the action of belt transmission. Since the lower rotary ring servo motor 4-8 is fixed to the upper rotary ring 4-4, when the upper rotary ring 4-4 rotates, the lower rotary ring 4-7 also rotates synchronously even if the lower rotary ring servo motor 4-8 is not turned on.

The copper wire tensioning wheel 4-14 that is configured to wind the copper wire 4-16 is mounted on the outer wall of the upper rotary ring 4-4. The copper wire tensioning wheel 4-14 may rotate around its own central axis, and the extension direction of the central axis is the vertical direction. The copper wire inlet hole 4-15 is provided in the side wall of the upper rotary ring 4-4, and the bottom of the upper rotary ring 4-4 is provided with the copper wire tractor 4-13, as shown in FIGS. 4*a*, 4*b* and 4*c*. The copper wire tractor 4-13 includes the first traction portion and the second traction portion, the first traction portion and the second traction portion extend in a direction far away from the inner wall of the upper rotary ring 4-4, and the other ends of the first traction portion and the second traction portion are provided with the copper wire passing holes respectively. The two copper wire passing holes form the guide channel for the copper wires 4-16 to pass therethrough, so as to prevent the copper wire 4-16 from being broken when extended or shortened. The copper wire heating body 4-12 is arranged on the bottom of the inner wall of the lower rotary ring 4-7, the copper wire heating body 4-12 and the copper wire tractor 4-13 are on the same horizontal plane, the free end of the copper wire 4-16 is connected to the copper wire heating body 4-12, and the copper wire heating body 4-12 is configured to heat the copper wire 4-16. When the lower rotary ring 4-7 rotates, the copper wire heating body 4-12 pulls the copper wire 4-16 to correspondingly extend or shorten the copper wire 4-16 in the cavity of the lower rotary ring 4-7, thus forming the first cutting portions 4-17 that have different diameters. In order to make the technical solution of the disclosure better understood by those skilled in the art, the disclosure will be described in detail with reference to the accompanying drawings. The description of this part is merely illustrative and explanatory, and should not limit the protection scope of the disclosure.

Specific examples are used herein to explain the principles and embodiments of the disclosure. The foregoing description of the examples is merely intended to help understand the method of the disclosure and its core ideas. The above embodiments are merely preferred embodiments of the disclosure. It should be noted that since words are limited in expression and infinite specific structures exist objectively, those skilled in the art can make several improvements, embellishments or changes, or appropriately combine the above technical features without departing from the principles of the disclosure. These improvements, embellishments, changes or combinations, or direct applications of the inventive concept and technical solutions to other scenarios without improvements should be regarded within the protection scope of the disclosure.

What is claimed is:

1. A skin manufacturing post-treatment method for an automobile collision dummy, comprising:
    obtaining a skin layer to be treated, wherein the skin layer to be treated at least comprises: an epidermis layer and a muscle layer that is formed at a side of the epidermis layer; selecting a first machining area on the skin layer to be treated, and forming a first pouring portion on the first machining area; and grinding the first pouring portion, and causing a side, far away from the epidermis layer, of the first pouring portion to dip, to form a patching recess;
    obtaining an epidermis layer to be treated, causing the epidermis layer to be treated to be above the first machining area, and a center of the epidermis layer to be treated to be on a central axis of the patching recess, and arranging a heating assembly above the patching recess, wherein the heating assembly has a heating space, and the epidermis layer to be treated is in the heating space;
    applying a first pressure to the epidermis layer to be treated along the central axis of the patching recess, and driving the patching recess to move in a direction close to the heating assembly until the heating assembly is attached to an interior of the patching recess, and the epidermis layer to be treated; and
    turning on the heating assembly, simultaneously heating the epidermis layer to be treated and the patching recess at a first preset temperature until accumulated heating time reaches first preset duration, and applying a second pressure to the epidermis layer to be treated along the central axis of the patching recess, wherein the second pressure enables the epidermis layer to be treated to be placed in the patching recess; and maintaining the second pressure for second preset duration until an outer wall of the epidermis layer to be treated is attached to an inner wall of the patching recess in a circumferential direction of the inner wall of the patching recess; wherein
    the forming a first pouring portion on the first machining area comprises:
        forming a first treatment portion on an epidermis layer of the first machining area by using a first cutting portion, wherein the first cutting portion has a second preset temperature; and
        cutting the first treatment portion by using the first cutting portion, and forming the first pouring portion; wherein the first cutting portion has a third preset temperature; wherein
        the second preset temperature is higher than the third preset temperature.

2. The skin manufacturing post-treatment method for the automobile collision dummy according to claim 1, wherein after the outer wall of the epidermis layer to be treated is attached to the inner wall of the patching recess, a redundant portion is formed along a circumferential edge of a top of the patching recess; and
    the treatment method further comprises:
        excising the redundant portion along the circumferential edge of the top of the patching recess.

3. The skin manufacturing post-treatment method for the automobile collision dummy according to claim 2, wherein after excising the redundant portion, the treatment method further comprises:
    clearing residual debris along the circumferential edge of the top of the patching recess.

4. The skin manufacturing post-treatment method for the automobile collision dummy according to claim 3, wherein the patching recess is frustum-shaped, and an opening end of the patching recess is a large-diameter end.

5. The skin manufacturing post-treatment method for the automobile collision dummy according to claim 4, wherein after the obtaining an epidermis layer to be treated, and before the causing the epidermis layer to be treated to be above the first machining area, the method further comprises:
    coating a side, close to the first machining area, of the epidermis layer to be treated with an adhesive layer, wherein a center of the adhesive layer is coaxial with the center of the epidermis layer to be treated.

6. The skin manufacturing post-treatment method for the automobile collision dummy according to claim 5, wherein an area ratio of the adhesive layer to the epidermis layer to be treated is 25:36.

7. The skin manufacturing post-treatment method for the automobile collision dummy according to claim 6, implemented based on a post-treatment device, wherein the post-treatment device comprises: a heating assembly; the heating assembly comprises a heating unit and a plurality of elastic reeds connected to the heating unit, the heating unit is configured to heat the elastic reeds, and the plurality of elastic reeds are distributed on the same circumference, and jointly define an accommodation space; free ends of the elastic reeds are heating portions, the heating portions are bent towards an interior of the accommodation space to form a frustum-shaped heating space, and a taper of the heating space is equal to a taper of the patching recess; and the heating portion has a first heating surface facing the heating space and a second heating surface facing away from the heating space, the first heating surface is configured to shape and heat the epidermis layer to be treated that is placed in the heating space, and the second heating surface is configured to heat the inner wall of the patching recess.

8. The skin manufacturing post-treatment method for the automobile collision dummy according to claim 7, wherein the post-treatment device further comprises a to-be-treated epidermis layer allocating assembly; the to-be-treated epidermis layer allocating assembly comprises a movement member, and a to-be-treated epidermis layer containment recess is provided in the movement member; and a to-be-treated epidermis layer glue containment recess is provided in a bottom of the to-be-treated epidermis layer containment recess, and a glue is contained in to-be-treated epidermis layer glue containment recess and is configured to form the adhesive layer.

9. The skin manufacturing post-treatment method for the automobile collision dummy according to claim 8, wherein the post-treatment device further comprises a cutting assembly; the cutting assembly comprises a direct-acting sleeve, an end of the direct-acting sleeve is rotatably connected to an upper rotary ring, and an end of the upper rotary ring is rotatably connected to a lower rotary ring; an upper rotary ring servo motor is arranged on the direct-acting sleeve, a lower rotary ring servo motor is arranged on the upper rotary ring, and the upper rotary ring servo motor and the lower rotary ring servo motor are configured to drive the upper rotary ring and the lower rotary ring to rotate respectively; an outer wall of the upper rotary ring is further provided with a copper wire tensioning wheel and a copper wire inlet hole for a copper wire to enter and exit, an inner wall of the lower rotary ring is provided with a copper wire tractor and a copper wire heating body, and the copper wire heating body is configured to heat the copper wire; and the copper wire forms first cutting portions that have different sizes in an inner cavity of the lower rotary ring under the condition that the upper rotary ring is motionless and the lower rotary ring rotates.

* * * * *